(12) United States Patent
Lee

(10) Patent No.: US 12,067,980 B2
(45) Date of Patent: Aug. 20, 2024

(54) ELECTRONIC DEVICE AND METHOD FOR EXECUTING TASK CORRESPONDING TO SHORTCUT COMMAND

(71) Applicant: Samsung Electronics Co., Ltd., Suwon-si (KR)

(72) Inventor: Jeongpyo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 17/273,699

(22) PCT Filed: May 23, 2019

(86) PCT No.: PCT/KR2019/006187
§ 371 (c)(1),
(2) Date: Mar. 4, 2021

(87) PCT Pub. No.: WO2020/050475
PCT Pub. Date: Mar. 12, 2020

(65) Prior Publication Data
US 2021/0327424 A1 Oct. 21, 2021

(30) Foreign Application Priority Data
Sep. 5, 2018 (KR) .......................... 10-2018-0105961

(51) Int. Cl.
*G10L 15/22* (2006.01)
*G06F 3/0482* (2013.01)

(52) U.S. Cl.
CPC ............ *G10L 15/22* (2013.01); *G06F 3/0482* (2013.01); *G10L 2015/223* (2013.01)

(58) Field of Classification Search
CPC .......................... G10L 15/22; G10L 2015/223
See application file for complete search history.

(56) References Cited

U.S. PATENT DOCUMENTS 5,867,817 A * 2/1999 Catallo ................... G10L 15/26
704/E15.044
5,873,064 A * 2/1999 De Armas ........... G06F 9/45512
704/E15.044

(Continued)

FOREIGN PATENT DOCUMENTS

JP 2009-253970 A 10/2009
JP 2014-146940 A 8/2014

(Continued)

OTHER PUBLICATIONS

International Search Report dated Sep. 19, 2019 in connection with International Patent Application No. PCT/KR2019/006187, 5 pages.

(Continued)

*Primary Examiner* — Brian L Albertalli

(57) ABSTRACT

Disclosed is an electronic device. An electronic device according to an embodiment comprises: a display; a microphone; a wireless communication circuit; a processor operatively connected to the display, the microphone, and the communication circuit; and a memory operatively connected to the processor, wherein the memory may store a plurality of user-customized tasks mapped to one of a selected word, phrase, or sentence, and may store instructions that, when executed, cause the processor to receive a first voice input according to user's utterance through the microphone, obtain context information related to the electronic device when one of the word, phrase, or sentence is included in the first voice input, select one task from among the plurality of tasks on the basis of at least in part on the context information, and perform the selected one task by using at least a part of the electronic device. Other embodiments understood through the present specification are also possible.

14 Claims, 23 Drawing Sheets

(56) References Cited

U.S. PATENT DOCUMENTS

| | | | |
|---|---|---|---|
| 6,873,951 B1* | 3/2005 | Lin | G10L 15/065 704/251 |
| 8,453,058 B1* | 5/2013 | Coccaro | G06Q 50/01 715/728 |
| 8,554,217 B2 | 10/2013 | Shin et al. | |
| 8,958,848 B2 | 2/2015 | Shin et al. | |
| 9,497,305 B2 | 11/2016 | Youn et al. | |
| 9,858,925 B2 | 1/2018 | Gruber et al. | |
| 9,940,924 B2 | 4/2018 | Park et al. | |
| 10,235,996 B2 | 3/2019 | Renard et al. | |
| 10,291,760 B2 | 5/2019 | Salmenkaita et al. | |
| 10,395,639 B2 | 8/2019 | Park et al. | |
| 10,643,611 B2* | 5/2020 | Lindahl | G10L 15/30 |
| 10,789,953 B2* | 9/2020 | Renard | G10L 15/24 |
| 10,896,671 B1* | 1/2021 | Mohajer | G10L 15/222 |
| 11,693,622 B1* | 7/2023 | Elders | G10L 15/22 704/257 |
| 2004/0176958 A1 | 9/2004 | Salmenkaita et al. | |
| 2006/0136221 A1* | 6/2006 | James | G06F 3/167 704/E15.045 |
| 2007/0124149 A1* | 5/2007 | Shen | G10L 15/26 704/E15.045 |
| 2008/0059195 A1* | 3/2008 | Brown | G10L 15/22 704/270 |
| 2008/0086306 A1* | 4/2008 | Hirota | H04M 3/4936 704/E15.044 |
| 2008/0300886 A1* | 12/2008 | Patch | G10L 15/22 704/E21.001 |
| 2012/0035932 A1* | 2/2012 | Jitkoff | G01C 21/3608 704/254 |
| 2012/0265528 A1* | 10/2012 | Gruber | G10L 15/183 704/235 |
| 2015/0348551 A1 | 12/2015 | Gruber et al. | |
| 2016/0111091 A1* | 4/2016 | Bakish | G10L 15/30 704/275 |
| 2016/0118048 A1* | 4/2016 | Heide | G10L 15/22 704/275 |
| 2016/0189717 A1* | 6/2016 | Kannan | G10L 17/22 704/275 |
| 2016/0277561 A1 | 9/2016 | Salmenkaita et al. | |
| 2016/0358603 A1* | 12/2016 | Azam | G10L 15/26 |
| 2018/0350353 A1 | 12/2018 | Gruber et al. | |
| 2018/0366108 A1* | 12/2018 | Mukherjee | G06F 16/90335 |
| 2019/0102482 A1* | 4/2019 | Ni | G10L 15/18 |
| 2019/0103103 A1* | 4/2019 | Ni | G06F 3/167 |
| 2019/0373102 A1* | 12/2019 | Weinstein | G06F 3/0482 |
| 2020/0035238 A1* | 1/2020 | Jung | G10L 15/22 |
| 2020/0043482 A1 | 2/2020 | Gruber et al. | |
| 2021/0224066 A1* | 7/2021 | Iwase | G06F 16/383 |
| 2022/0244910 A1* | 8/2022 | Wang | G10L 15/1822 |

FOREIGN PATENT DOCUMENTS

| | | |
|---|---|---|
| KR | 10-1830619 B1 | 8/2011 |
| KR | 10-2013-0035983 A | 4/2013 |
| KR | 10-2014-0053760 A | 5/2014 |
| KR | 10-2014-0074549 A | 6/2014 |
| KR | 10-2017-0070094 A | 6/2017 |

OTHER PUBLICATIONS

Office Action issued Apr. 18, 2024, in connection with Korean Patent Application No. 10-2018-0105961, 12 pages.

* cited by examiner

| QUICK COMMAND | CAPSULE INFORMATION | TASK INFORMATION | UTTERANCE CONTENTS | EXECUTION CONDITION INFORMATION |
|---|---|---|---|---|
| AMERICANO | STARBUCKS | S.Num2<br>S.Num33<br>S.Num7 | "AMERICANO ORDER AND PAYMENT"<br>"COFFEE SHOP WIFI CONNECTION" | GPS INFORMATION |
| ORDER | STARBUCKS | | "ORDER NEW MENU"<br>"SAMSUNG CARD PAYMENT" | |
| GOOD NIGHT | Milk | | "PLAY LULLABY" | |
| GOOD MORNING | Milk | | "PLAY POPULAR SONGS" | |
| GOOD NIGHT | User | | "TURN ON BLUE LIGHT FILTER"<br>"SWITCH TO VIBRATION MODE" | |
| GOOD MORNING | User | | "TELL ME TODAY'S WEATHER"<br>"GIVE ME NEWS BRIEFING" | GPS INFORMATION |
| ORDER | CGV | | "ORDER POPCORN COLA SET WITH SAMSUNG PAY": | |
| MOVIE THEATER | CGV | | "TURN ON SILENT MODE"<br>"REJECT ALL INCOMING CALLS"<br>"ACCESS MOVIE DESCRIPTION PAGE" | GPS INFORMATION<br>TIME |

| QUICK COMMAND | CAPSULE INFORMATION | TASK INFORMATION | UTTERANCE CONTENTS | EXECUTION CONDITION INFORMATION |
|---|---|---|---|---|
| AMERICANO | STARBUCKS | S.Num2<br>S.Num33<br>S.Num7 | "AMERICANO ORDER AND PAYMENT",<br>"COFFEE SHOP WIFI CONNECTION" | GPS INFORMATION |
| ORDER | STARBUCKS | | "ORDER NEW MENU"<br>"SAMSUNG CARD PAYMENT" | |

520

| QUICK COMMAND | CAPSULE INFORMATION | TASK INFORMATION | UTTERANCE CONTENTS | EXECUTION CONDITION INFORMATION |
|---|---|---|---|---|
| GOOD NIGHT | Milk | | "PLAY LULLABY" | |
| GOOD MORNING | Milk | | "PLAY POPULAR SONGS" | |

530

| QUICK COMMAND | CAPSULE INFORMATION | TASK INFORMATION | UTTERANCE CONTENTS | EXECUTION CONDITION INFORMATION |
|---|---|---|---|---|
| ORDER | CGV | | "ORDER POPCORN COLA SET WITH SAMSUNG PAY" | GPS INFORMATION |
| MOVIE THEATER | CGV | | "TURN ON SILENT MODE"<br>"REJECT ALL INCOMING CALLS"<br>"ACCESS MOVIE DESCRIPTION PAGE" | GPS INFORMATION<br>TIME |

540

| QUICK COMMAND | CAPSULE INFORMATION | TASK INFORMATION | UTTERANCE CONTENTS | EXECUTION CONDITION INFORMATION |
|---|---|---|---|---|
| GOOD NIGHT | User | | "TURN ON BLUE LIGHT FILTER"<br>"SWITCH TO VIBRATION MODE" | |
| GOOD MORNING | User | | "TELL ME TODAY'S WEATHER"<br>"GIVE ME NEWS BRIEFING" | |

FIG.5

| STARBUCKS QUICK COMMAND | CAPSULE INFORMATION | TASK INFORMATION | UTTERANCE CONTENTS | EXECUTION CONDITION INFORMATION |
|---|---|---|---|---|
| AMERICANO | STARBUCKS | S.Num2<br>S.Num33<br>S.Num7 | "AMERICANO ORDER AND PAYMENT"<br>"COFFEE SHOP WIFI CONNECTION" | GPS INFORMATION |
| ORDER | STARBUCKS | | "ORDER NEW MENU"<br>"SAMSUNG CARD PAYMENT" | |

1210

| CGV QUICK COMMAND | CAPSULE INFORMATION | TASK INFORMATION | UTTERANCE CONTENTS | EXECUTION CONDITION INFORMATION |
|---|---|---|---|---|
| ORDER | CGV | | "ORDER POPCORN COLA SET WITH SAMSUNG PAY" | GPS INFORMATION |
| MOVIE THEATER | CGV | | "TURN ON SILENT MODE"<br>"REJECT ALL INCOMING CALLS"<br>"ACCESS MOVIE DESCRIPTION PAGE" | GPS INFORMATION<br>TIME |

ELECTRONIC DEVICE AND METHOD FOR EXECUTING TASK CORRESPONDING TO SHORTCUT COMMAND

CROSS-REFERENCE TO RELATED APPLICATIONS

This application is a 371 of International Application No. PCT/KR2019/006187 filed on May 23, 2019, which claims priority to Korean Patent Application No. 10-2018-0105961 filed on Sep. 5, 2018, the disclosures of which are herein incorporated by reference in their entirety.

BACKGROUND

1. Field

Embodiments disclosed herein are related to speech recognition service technology.

2. Description of Related Art

A user terminal may provide a service based on the user's speech input. For example, when a user's speech input "Tell me today's weather?" is received, the user terminal may provide a weather guide service corresponding to the received speech input to the user.

A user needs to utter a long sentence containing the user's own intention or perform several utterances to receive a service based on a speech input. However, it may be very cumbersome to utter a long sentence every time to receive the same service.

To prevent such inconvenience, the user may register a short quick command in the user terminal to replace a long speech command—a speech command with a large number of texts included in the speech command—and then utter the registered quick command to receive a service corresponding to speech input. For example, the user may register a quick command "Hong Gil-dong" to replace a long speech command "Text Hong Gil-dong to meet you tomorrow" in the user terminal, and utter "Hong Gil-dong" to text Hong Gil-dong to meet you tomorrow. Then, the user terminal may identify that the received speech input is the registered quick command "Hong Gil-dong", perform an action mapped to the quick command "Hong Gil-dong", for example, an action of executing a text sending application, searching for a contact of Hong Gil-dong included in an address book, specifying the contact of Hong Gil-dong as a recipient, inputting text "Let's meet tomorrow", and sending the completed text.

Various embodiments disclosed herein provides an electronic device capable of performing a task (including at least one action) mapped to a quick command when the speech input corresponds to a quick command, and a method of performing a task mapped to the quick command.

SUMMARY

According to an embodiment disclosed herein, an electronic device may include a display, a microphone, a wireless communication circuit, a processor operatively connected to the display, the microphone, and the communication circuit; and a memory operatively connected to the processor, and the memory may store a plurality of, user-customized tasks mapped to one of a selected word, phrase or sentence, and store instructions which, when executed, cause the processor to receive a first speech input according to utterance of the user through the microphone, obtain context information related to the electronic device when one of the word, phrase or sentence is included in the first speech input, select one of the plurality of tasks based at least in part on the context information, and perform the selected one task using at least a part of the electronic device.

Further, according to an embodiment disclosed herein, an electronic device may include a display, a microphone, at least one processor, and at least one memory, wherein the memory may be configured to store a plurality of, user-customized tasks mapped to one of a selected word, phrase or sentence, and store instructions which, when executed, cause the processor to receive a first speech input through the microphone, obtain context information related to the electronic device when one of the word, phrase or sentence is included in the first speech input, select one of the plurality of tasks based at least in part on the context information, and perform the selected one task.

According to an embodiment disclosed herein, a method of performing a task corresponding to a quick command in at least one processor may include receiving a first speech input through the microphone; obtaining context information related to the electronic device when one of a selected word, phrase or sentence mapped to a plurality of tasks is included in the first speech input; selecting one of the plurality of tasks based at least in part on the context information, and performing the selected one task using at least a part of the electronic device.

According to the embodiments disclosed in this document, when there are a plurality of tasks for one quick command, the electronic device (or user terminal) may selectively perform a task more suitable for the user's situation among the plurality of tasks. In addition, various effects may be provided that are directly or indirectly understood through the disclosure.

BRIEF DESCRIPTION OF THE DRAWINGS

FIG. 4 illustrates an example of managing quick commands in one table according to an embodiment.

FIG. 5 illustrates an example of managing quick commands according to an embodiment in a plurality of tables for each domain.

FIG. 12 is an exemplary diagram of a plurality of quick commands using the same text according to an embodiment.

In the description of the drawings, the same or similar reference numerals may be used for the same or similar components.

DETAILED DESCRIPTION

Figure 1:
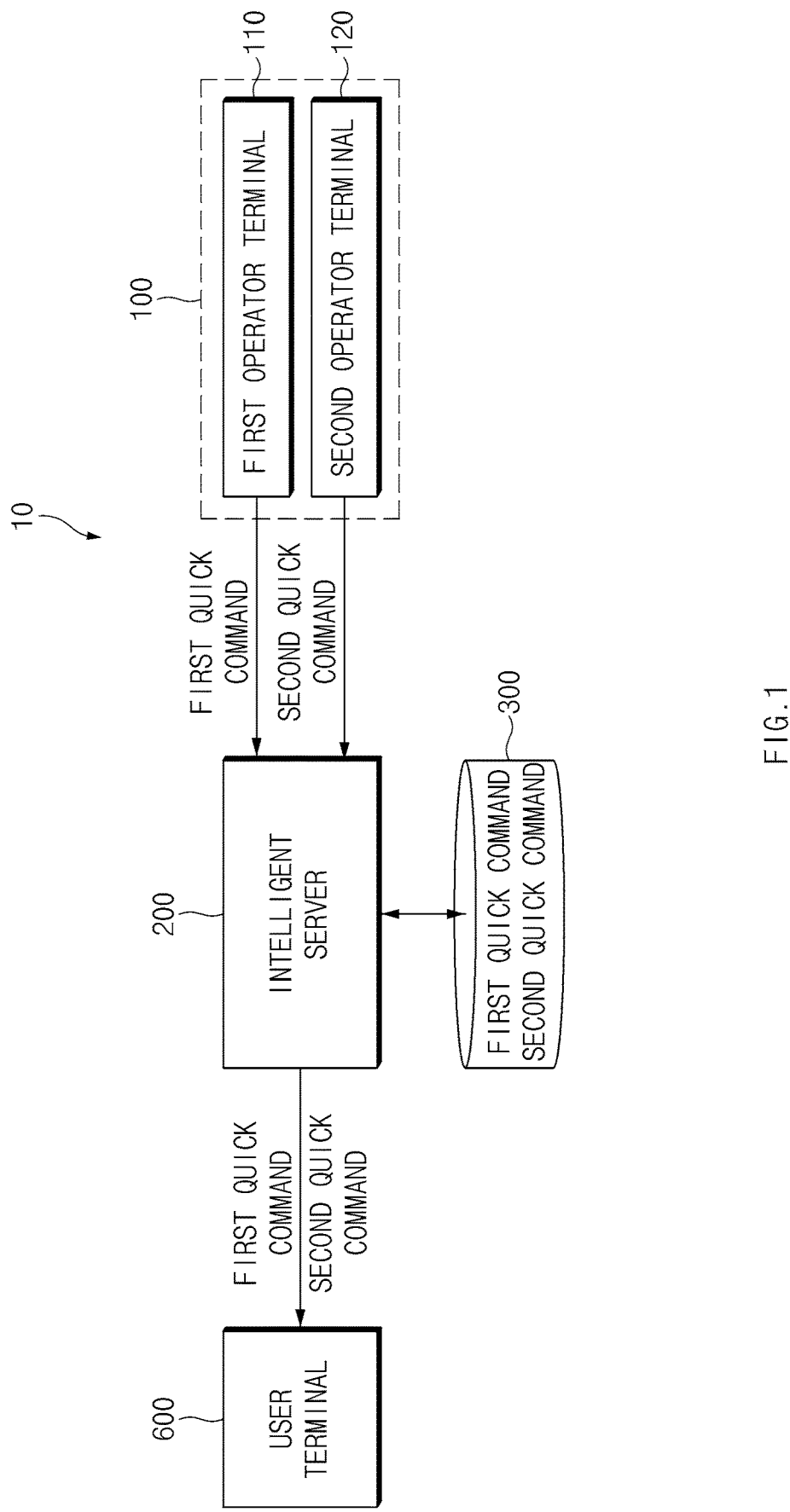
FIG. 1 illustrates a speech recognition-based task execution system according to an embodiment.

FIG. 1 illustrates a speech recognition-based task execution system according to an embodiment.

Referring to FIG. 1, a speech recognition-based task execution system 10 may include a user terminal 600, an intelligent server 2200, and an operator terminal 100. In FIG. 1, a case where the operator terminal 100 includes a first operator terminal 110 and a second operator terminal 120 has been described as an example, but the disclosure may not be limited thereto. For example, the operator terminal 100 may include one or three or more operator terminals.

According to an embodiment, the user terminal 600 may be an electronic device that provides a service based on a speech input, which is used by a user. The user terminal 600 may cooperate with the intelligent server 2200 to provide a service corresponding to a speech input.

According to an embodiment, the user terminal 600 may generate a quick command to replace at least one long speech command according to a user input (e.g., touch input), and register the generated quick command in the user terminal 600. When registering a quick command, the user terminal 600 may associate a command list corresponding to at least one long speech command (a text list recognized from each speech command) with the quick command and register the quick command in the user terminal 600. The quick command registered in the user terminal 600 by the user terminal 600 may be also synchronized with and stored in the intelligent server 2200. The quick command may be specified by a user's input, generated based on the user's utterances, or provided from another electronic device (e.g., the intelligent server 2200).

According to an embodiment, the operator terminal 100 may generate a quick command to replace a long speech command according to another user input, and register the generated quick command in the intelligent server 2200. When registering a quick command in the intelligent server 2200, the operator terminal 100 may associate a command list corresponding to at least one long speech command (a text list recognized from each speech command) with the quick command and register the quick command in the user terminal 600. The operator terminal 100 may be, for example, an electronic device operated by another user (e.g., a business operator or a developer employed by a business operator) who wants to provide the generated quick command to the user terminal 600. According to various embodiments, the operator terminal 100 may provide the generated quick command to the user terminal 600 without going through the intelligent server 2200. For example, the operator terminal 100 may provide a generated quick command based on a push service to the user terminal 600. According to the above-described embodiment, the operator terminal 100 may provide the generated quick command to the user terminal 600 during at least a specified period for, for example, promotion of a service being provided.

According to an embodiment, when receiving a speech input from the user terminal 600, the intelligent server 2200 may recognize text from the speech input and transmit the recognized text to the user terminal 600. The intelligent server 2200 may determine an action of the user terminal 600 corresponding to the recognized text, and transmit information (e.g., plan) necessary for the user terminal 600 to perform the determined action to the user terminal 600. Thereafter, when receiving the necessary information from the intelligent server 2200, the user terminal 600 may provide a service corresponding to the speech input by performing an action corresponding to the speech input according to the received information.

According to an embodiment, when receiving a quick command to be registered from the user terminal 600 or the operator terminal 100, the intelligent server 2200 may store the received quick command in a database 300. For example, the intelligent server 2200 may receive a first quick command from the first operator terminal 110, receive a second quick command from the second operator terminal 120, and store the first quick command and the second quick command in the database 300.

According to an embodiment, the intelligent server 2200 may provide a registered quick command to the user terminal 600. For example, the intelligent server 2200 may provide the quick command registered in the database 300 to the user terminal 600 through a push service, or to the user terminal 600 at a request of the user terminal 600.

According to the above-described embodiment, the quick command may contain relatively short speech content, and the quick commands (e.g., order) preferred by a user or business operator (e.g., coffee business operator) are limited, so that the possibility that the quick commands overlap each other may increase as the number of quick commands increases.

Figure 2:
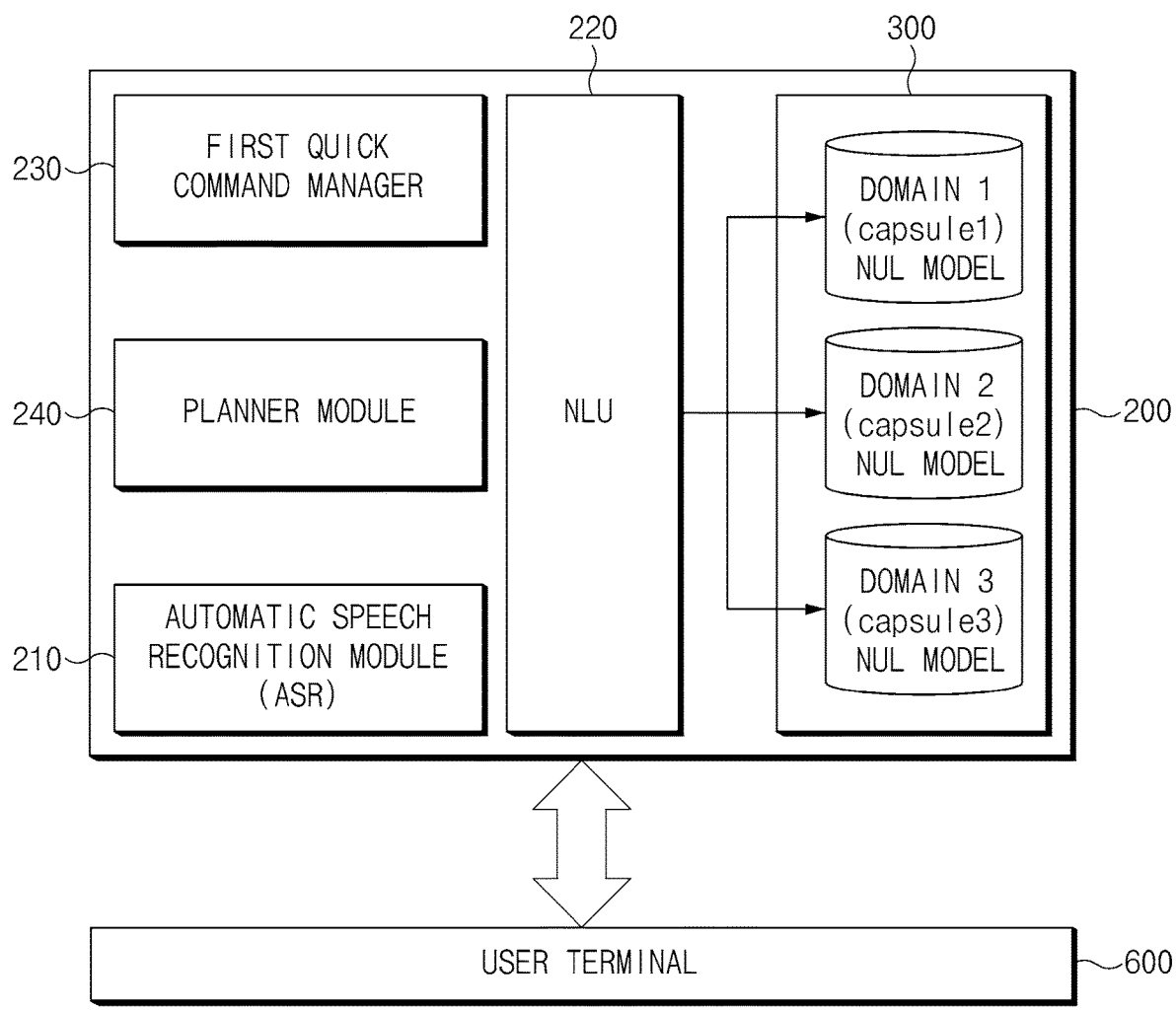
FIG. 2 illustrates an intelligent server according to an embodiment.

FIG. 2 illustrates an intelligent server according to an embodiment.

Referring to FIG. 2, the intelligent server 2200 may include an automatic speech recognition module (ASR) 2210, a natural language understanding module (NLU) 2220, a planner module 2240, and a first quick command manager 2230. The automatic speech recognition module 2210, the natural language understanding module 2220, the planner module 2240, and the first quick command manager 2230 may be at least one hardware module or a software module implemented by a processor of the intelligent server 2200.

According to an embodiment, the automatic speech recognition module 2210 may recognize text corresponding to speech data based on the speech data received from the user terminal 600. For example, the automatic speech recognition module 2210 may convert the received speech data into text (recognized text) using information related to utterance and unit phoneme information.

According to an embodiment, the natural language understanding module 2220 may determine a user's intention based on the recognized text. The natural language understanding module 2220 may perform grammatical analysis and semantic analysis on the recognized text. The natural language understanding module 2220 may divide the recognized text into grammatical units (e.g., words, phrases, morphemes), and figure out what grammatical elements the divided units have (grammatical analysis). The natural language understanding module 2220 may perform semantic analysis using semantic matching, rule matching, and formula matching. The natural language understanding module 2220 may determine the user's intention by using a natural language understanding model in which linguistic features for figuring out the user's intention from the recognized text are stored.

The database 300 may include a plurality of natural language recognition models, and therefore, the natural language understanding module 2220 may select one natural language recognition model (hereinafter referred to as a domain) from among the plurality of natural language recognition models stored in the database 300, and determine the user's intention based on the selected natural language recognition model. For example, when a domain specified by the user terminal 600 is present before a speech input, the natural language understanding module 2220 may determine the user's intention corresponding to the speech input using only the specified domain.

According to an embodiment, when the user's intention is determined by the natural language understanding module 2220, the planner module 2240 may generate a plan for performing an action according to the user's intention. The plan may include, for example, a plurality of actions arranged in stages (or hierarchically) to perform the actions according to the user's intention. The planner module 2240 may transmit the generated plan to the user terminal 600.

According to an embodiment, the first quick command manager 2230 may perform processing related to a quick command registered in the database 300. For example, when the quick command is registered in the database 300 by the user terminal 600 or the operator terminal 100, the first quick command manager 2230 may induce the user terminal 600 or the operator terminal 100 to set (or specify) additional information in addition to a command list related to the quick command. The additional information may include, for example, a domain to which the quick command belongs, task information mapped to the quick command (e.g., ID of an action included in a task mapped to the quick command), and execution condition information of the task mapped to the quick command. The execution condition information of the task mapped to the quick command may be a selection condition of the quick command. Details will be described later.

According to an embodiment, the first quick command manager 2230 may store the set additional information in association with the quick command. For example, when a domain to which a quick command belongs is specified, the first quick command manager 2230 may store the quick command in association with the specified domain information. For another example, when task information mapped to a quick command is specified, the first quick command manager 2230 may store the quick command in association with the task information mapped to the quick command. As still another example, when a task execution condition mapped to a quick command is set, the first quick command manager 2230 may associate and store the quick command and execution condition information of a task.

According to an embodiment, the first quick command manager 2230 may provide the quick command registered in the database 300 to the user terminal 600 at a request of the user terminal 600. For example, when the user terminal 600 requests a quick command list registered in the database 300, the first quick command manager 2230 may provide the quick command list to the user terminal 600 in response to the request.

According to an embodiment, the first quick command manager 2230 may track context information related to the user terminal 600, and when it is determined from the context information that a situation of the user terminal 600 meets the execution condition related to the first quick command, recommend the first quick command to the user terminal 600 through a push service. For example, the execution condition information related to the first quick command may include a condition where a movie theater access point (AP) is found, a condition where GPS information is within a specified radius from the movie theater, a condition where a current time coincides with a movie screening time, and a condition where an illuminance is less than or equal to a specified threshold. In this case, the first quick command manager 2230 may track context information related to the user terminal 600 which is communicating with the intelligent server 2200, and provide a notification window that induces registration of command 'Movie Theater' to the user terminal 600 in the event of a situation where the user terminal 600 corresponds to the execution condition information based on the context information (e.g., a movie theater AP is found, the GPS information is within the specified radius from the movie theater, the current time coincides with the movie screening time, and the illuminance is less than or equal to the specified threshold).

According to an embodiment, the first quick command manager 2230 may receive a quick command confirmation request from the user terminal 600 for whether the recognized text corresponds to the quick command, and determine whether there a quick command matching the recognized text is present in the database 300. The first quick command manager 2230 may obtain a command list related to the quick command from the database 300 when the quick command matching the recognized text is present. The first quick command manager 2230 may transmit the obtained command list related to the quick command to the user terminal 600. The command list related to the quick command may be a text list recognized from a long speech command related to the quick command.

According to an embodiment, the database 300 may include a plurality of quick commands matching the recognized text. The presence of a plurality of quick commands matching the recognized text may lead to a result of the presence of a plurality of tasks mapped to the quick commands matching the recognized text. In this case, the first quick command manager 2230 may obtain context information related to the user terminal 600, select one quick command from among a plurality of quick commands based at least on the context information, and transmit a command list related to the selected quick command to the user terminal 600. The context information may include at least one of, for example, location information (e.g., a specific area) of the user terminal 600, application or service information used in the user terminal 600, session information of the user terminal 600, display information of the user terminal 600, Wi-Fi state (e.g., on or off) information of the user terminal 600, or time information of the user terminal 600. The application or service information may include at least one of, for example, an application (application installed in the user terminal 600) or an execution status (e.g., running) of a service (online service or offline service), usage history (e.g., use frequency or last use time). The session information may include at least one of, for example, domain information specified by a processor 660 through the intelligent server 2200. The display information may include at least one of, for example, screen source information (e.g., URL, registrant information), image information, or text information, as screen-related information displayed on a display 640. The Wi-Fi state information may include a setting state (e.g., on state or off state) of a Wi-Fi communication channel included in a communication circuit 610. The Wi-Fi state information may include a state of capable of searching for specified AP information (e.g., a unique identifier). For example, the first quick command manager 2230 may determine whether a specified domain exists before a speech input based on the session information, and when the specified domain exists, select a quick command that belongs to the specified domain from among a plurality of quick commands matching the recognized text. For another example, the first operator may register a plurality of quick commands having different execution condition information and provide various services based on the registered plurality of quick commands. For example, a first coffee business operator may register two 'order' quick commands in the intelligent server 2200, associate a first 'order' quick command with utterance content of "Order ice coffee", and set context information of the first 'order' quick command to a period of from July to September. In addition, the first coffee business operator may associate a second 'order' quick command with 'Order Hot Chocolate' and set execution condition information of the second 'order' quick command to a period of from November to December. In this case, when the first quick command manager 2230 receives a speech input of 'order' through the user terminal 600, the first quick command manager 2230 may obtain July as current date information, and select a task mapped to a quick command related to the corresponding "Order Ice Coffee" corresponding to the current date information among the two 'order' quick commands.

According to various embodiments, at least a part of the intelligent server 2200 may be included in the user terminal 600. For example, the automatic speech recognition module 2210 may be included in the user terminal 600.

Figure 3:
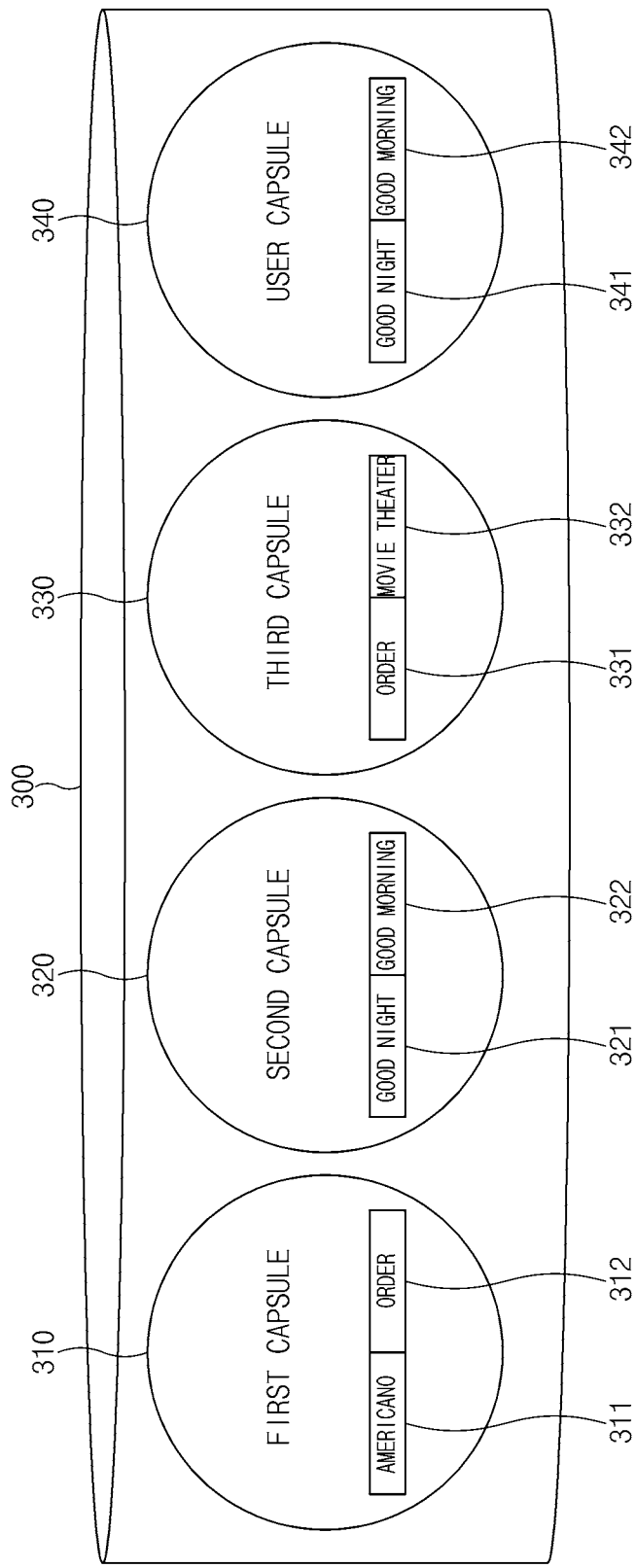
FIG. 3 illustrates a conceptual diagram of a database according to an embodiment.

FIG. 3 illustrates a conceptual diagram of a database (e.g., the database 300 of FIG. 1) according to an embodiment.

Referring to FIG. 3, as described above, each of quick commands registered in the database 300 may belong to one of a plurality of domains. For example, 'Americano' (e.g., related to a command list including 'Americano order and payment') and 'order' quick command (e.g., related to a command list including 'New menu order') which are registered by a first business operator may belong to a first domain (e.g., created by the first business operator). Alternatively, 'Good Night' (e.g., related to a command list including 'play lullaby') and 'Good Morning' (e.g., related to a command list including 'Play popular songs') which are registered by a second business operator may belong to a second domain (e.g., created by the second business operator). 'Order' (e.g., related to 'Order popcorn cola Set with Samsung Pay') and 'Movie Theater' (e.g., related to a command list including 'Turn on silent mode' and 'Reject all incoming calls') which are registered by a third business operator may belong to a third domain (e.g., created by a third business operator). Alternatively, 'Good Night' (e.g., related to a command list including 'Turn on blue light filter') and 'Good morning' (e.g., related to a command list including 'Tell me today's weather') quick commands which are registered by the user may belong to a user domain.

As in the above-described embodiments, a plurality of quick commands registered by different entities are present in the database 300, and therefore, the plurality of quick commands may overlap each other (e.g., there are a plurality of quick commands using the same text and mapped to different tasks).

FIG. 4 illustrates an example of managing quick commands in one table according to an embodiment.

Referring to FIG. 4, an intelligent server (e.g., the intelligent server 2200 of FIG. 1) may manage quick commands registered (stored) by the user terminal 600 through one table in the database 300. In FIG. 4, capsule information may include domain information to which each quick command belongs, for example. Task information may store, for example, a unique value (ID) of at least one action included in each task mapped to a quick command. The task information may replace a command list related to a quick command. Utterance content may include, for example, text recognized based on at least one long speech command (a command list related to a quick command). Execution condition information may include an execution condition of a task mapped to each quick command. For example, the execution condition information may include specified location information (e.g., GPS) or specified time information. According to various embodiments, quick commands registered in the intelligent server 2200 may also be stored in the user terminal 600.

FIG. 5 illustrates an example of managing quick commands according to an embodiment in a plurality of tables for each domain.

Referring to FIG. 5, quick commands registered in the database 300 may be stored in a plurality of tables for domains to which the quick commands belongs respectively. For example, the database 300 may manage quick commands belonging to a first domain (e.g., Starbucks) in a first table 510, quick commands belonging to a second domain (e.g., Milk) in a second table 520, quick commands belonging to a third domain (e.g., CGV) in a third table 530, and quick commands belonging to a user domain in a fourth table 540. According to various embodiments, the first to fourth tables 510, 520, 530, and 540 may be stored in a device of a first business operator (e.g., the first operator terminal 110 of FIG. 1), and a device of a second business operator (e.g., the second operator terminal 120 of FIG. 1), a device of a third business operator, and a device of a user (e.g., the user terminal 600).

Figure 6:
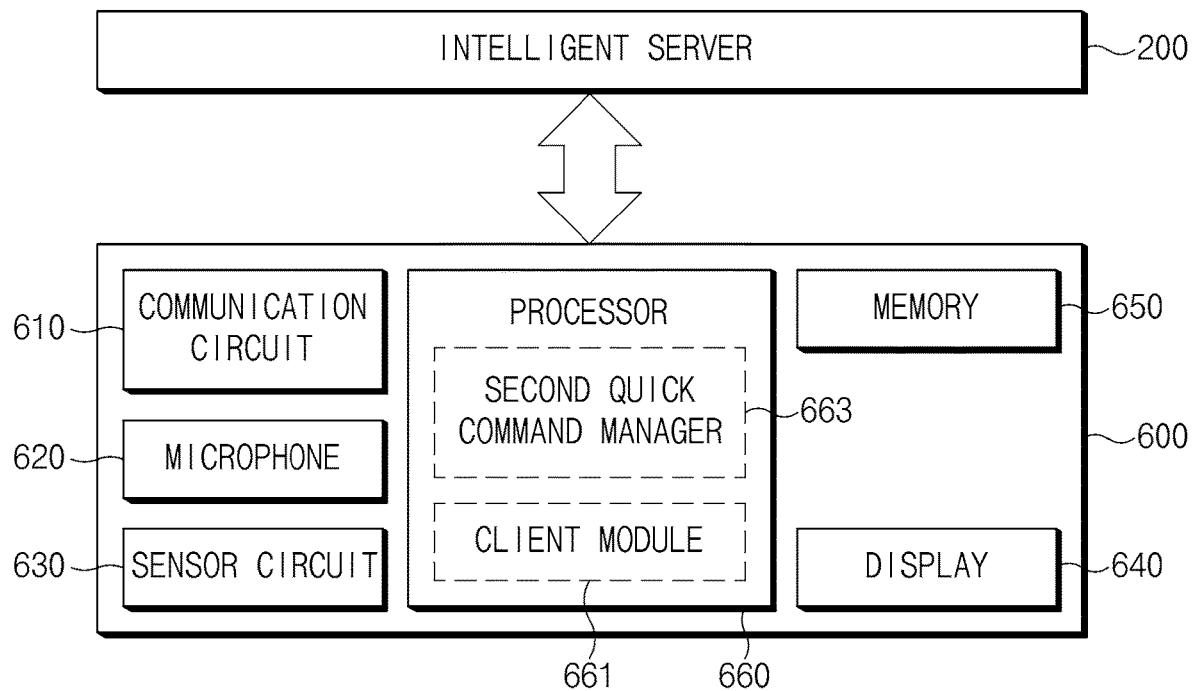
FIG. 6 illustrates a user terminal according to an embodiment.

FIG. 6 illustrates a user terminal according to an embodiment.

Referring to FIG. 6, the user terminal 600 may include the communication circuit 610, a microphone 620, a sensor circuit 630, the display 640, a memory 650, and the processor 660.

According to an embodiment, the communication circuit 610 may establish a communication channel capable of communicating with an external electronic device (e.g., the intelligent server 2200). The communication channel may include a wireless communication channel such as WiFi, LTE, and 5G.

According to an embodiment, the microphone 620 may receive a speech input of a user. For example, the microphone 620 may receive a speech input and output a signal corresponding to the received speech input.

According to an embodiment, the sensor circuit 630 may be a GPS module that calculates location information (e.g., GPS information).

The display 640 may display, for example, a variety of content (e.g., text, images, videos, icons, and/or symbols). The display 640 may include, for example, a liquid crystal display (LCD), a light emitting diode (LED) display, an organic light emitting diode (OLED) display, or an electronic paper display. The display 640 may be, for example, a touch screen display capable of detecting a user's touch. The user input to be described below may be, for example, a touch input.

The memory 650 may store, for example, commands or data related to at least one other component of the user terminal 600. The memory 650 may be a volatile memory (e.g., RAM), a nonvolatile memory (e.g., ROM or flash memory), or a combination thereof. According to an embodiment, the memory 650 may be configured to store a plurality of tasks mapped to one of a selected word, phrase, or sentence—a quick command—and customized by a user. The customization by the user may mean that a task corresponding to a quick command is arbitrarily specified by the user. The customized task may include a plurality of actions. Referring to FIG. 4, when the quick command is "movie theater", a plurality of actions may include changing to a silent mode, rejecting an incoming call, and accessing a movie description page (see line 9 of FIG. 4). The customized task may include a plurality of actions using a plurality of application programs. Referring to FIG. 4, for example, when the quick command is "movie theater", a plurality of application programs may be a setting application, a phone application, and a browser application. The memory 650 may store instructions, that when executed, cause the processor 660 to receive a first speech input according to utterance of a user through the microphone 620, and when one of a word, a phrase, or a sentences is included in the first speech input, obtain context information related to the user terminal 600, select one of a plurality of tasks based at least in part on the context information, and execute the selected one task using at least a part of the user terminal 600.

The processor 660 may perform actions and data processing relating to control and/or communication for at least one of other components of the user terminal 600 using the instructions stored in the memory 650. The processor 660 may include at least one of, for example, a central processing unit (CPU), a graphics processing unit (GPU), a microprocessor, an application processor, an application specific integrated circuit (ASIC), and field programmable gate arrays (FPGA), and may have a plurality of cores.

According to an embodiment, the processor 660 may include a client module 661 and a second quick command manager 663. Each of the client module 661 and the second quick command manager 663 may be at least one hardware module or a software module implemented by the processor 660. When an intelligent app that provides a service based on a speech input is executed, the processor 660 may execute the client module 661 and provide a service based on the speech input by the client module 661. When the client module 661 is executed by the processor 660, the client module 661 may receive a speech input and perform an action corresponding to the received speech input. The processor 660 may execute the second quick command manager 663 for performing quick command-related processing, and perform specification, generation and registration of a quick command and determination of a command list related to the quick command, by the second quick command manager 663. Hereinafter, the processing of the second quick command manager 663 is described as processing by the processor 660 for convenience of description.

According to an embodiment, when receiving a speech input of a user through the microphone 620, the processor 660 may perform an action corresponding to the received speech input. For example, when receiving the speech input, the processor 660 may convert the received speech input into speech data, transmit the speech data to the intelligent server 2200 through the communication circuit 610, and receive text recognized by the intelligent server 2200 based on the speech data from the intelligent server 2200. The processor 660 may receive a plan corresponding to the recognized text from the intelligent server 2200, and perform an action corresponding to the speech input according to the received plan, that is, an action of executing a specified application and an action of providing a service through the executed application.

According to an embodiment, when a quick command to replace at least one long speech command is registered, the processor 660 may associate the registered quick command with text recognized from the at least one long speech command (a command list related to the quick command described above) and store the quick command and the recognized text in the memory 650. The quick command may include, for example, a word, phrase or sentence selected (or specified) by a user or a business operator. For example, when the processor 660 is requested to register a quick command of 'company' to replace two long speech inputs such as "Turn on company Wi-Fi" and "Switch to vibration mode of mobile phone", the processor 660 may associate the quick command 'company' with a command list including "Turn on company Wi-Fi" and "Switch to vibration mode of mobile phone" and store the quick command and the command list in the memory 650. According to various embodiments, the quick command may be related to task information (e.g., at least one action ID) mapped to the quick command. For example, the processor 660 may associate the quick command 'company' with a first action ID corresponding to "Turn on company Wi-Fi" and a second action ID corresponding to "Switch to vibration mode of mobile phone" and store task information including the first action ID and the second action ID and the quick command 'company' in the memory 650. In this case, the processor 660 may transmit task information (e.g., at least one action ID) related to the quick command to the intelligent server 2200 instead of a command list related to the quick command when performing a task mapped to the quick command. When receiving the task information related to the quick command, the intelligent server 2200 may identify actions corresponding to the quick command based on the task information, create a plan for executing the identified actions, and transmit the created plan to the user terminal 600.

According to an embodiment, the processor 660 may determine whether the user terminal 600 is capable of performing all tasks mapped to the quick command in the process of registering the quick command. The processor 660 may display a guide screen when the user terminal 600 is not capable of performing at least some of the tasks mapped to the quick command. For example, the processor

660 may output a guide screen that enables at least some of the tasks mapped to the quick command to be performed. The guide screen may include, for example, a version upgrade guidance screen of an intelligent app or an installation or version upgrade guidance screen of an app providing a task mapped to the quick command.

According to an embodiment, the processor 660 may identify that the first text is a previously-registered quick command (mapped to a second task) in the process of mapping a first text to a first task and registering the first text in the memory 650 as a quick command. When the first text is previously registered as a quick command, the processor 660 may display a UI screen inquiring whether to change the first text to be used as a quick command on the display 640.

When the processor 660 identifies a user input that does not agree to the change of the first text, the processor 660 may map the first task to the first text and store the first text in the memory 650 as a quick command, separately from the previously-registered quick command (hereinafter, referred to as 'second quick command') mapped to the second task. In this case, the processor 660 may provide an interface for setting whether to use the first quick command and whether to use the second quick command. The setting of whether to use the first quick command may correspond to the setting of whether to use the first task. The setting of whether to use the second quick command may be a setting of whether to use the second task. Thereafter, when the processor 660 recognizes the first text from a speech input, the processor 660 may select a task mapped to a quick command set to be used among the first quick command and the second quick command based on use setting information of the first quick command and the second quick command.

The processor 660 may provide an interface for changing the first text to be used as the quick command when identifying a user input agreeing to the change of the first text to be used as the quick command. When the first text to be used as the quick command is changed to the second text, the processor 660 may store the second text as a quick command mapped to the first task in the memory 650.

According to an embodiment, when the processor 660 obtains text recognized from a speech input, the processor 660 may determine whether the recognized text corresponds to a quick command, and when the recognized text corresponds to the quick command, perform a task mapped to the quick command that is the recognized text. The task mapped to the quick command may be, for example, performing at least one action corresponding to a command list related to the quick command. For example, the processor 660 may obtain the command list related to the quick command from the memory 650 and transmit the command list related to the quick command to the intelligent server 2200. The processor 660 may receive a plan corresponding to the command list related to the quick command from the intelligent server 2200 and perform a task mapped to the quick command according to the received plan. According to various embodiments, the task mapped to the quick command may be a command list related to the quick command, or a task for transmitting the command list related to the quick command to the intelligent server 2200.

According to an embodiment, when text recognized from the speech input corresponds to a quick command, and there are a plurality of tasks mapped to the recognized text, the processor 660 may obtain context information related to the user terminal 600 and select one task among the plurality of tasks based at least in part on the context information. The context information may include at least one of, for example, location information (e.g., a specific area) of the user terminal 600, application or service information used in the user terminal 600, session information of the user terminal 600, display information of the user terminal 600, Wi-Fi status (e.g., on or off) information of the user terminal 600, or time information of the user terminal 600. The application or service information may include at least one of, for example, an execution status (e.g., running) or usage history (e.g., use frequency or last use time) of an application (application installed in the user terminal 600) or a service (online service or offline service). The session information may include at least one of, for example, domain information specified by the processor 660 through the intelligent server 2200. The display information may include at least one of, for example, screen source information (e.g., URL, registrant information), image information, or text information, as screen-related information displayed on the display 640. The Wi-Fi state information may include a setting state (e.g., on state or off state) of a Wi-Fi communication channel included in the communication circuit 610. The Wi-Fi state information may include a state of capable of searching for specified AP information (e.g., a unique identifier).

Additionally, the processor 660 may identify execution condition information related to a plurality of tasks mapped to the recognized text that is a quick command, and select one of the plurality of tasks based on context information and execution condition information. The execution condition information of the task may be information (e.g., context information) defining a situation of a user terminal (e.g., the user terminal 600) that allows the execution of a task mapped to a quick command.

According to an embodiment, when a third task set to be performed at a specified location is included in a plurality of tasks mapped to a quick command (matching recognized text), the processor 660 may obtain location information of the user terminal 600 through the sensor circuit 630. When the processor 660 identifies that the user terminal 600 is located at a specified location (e.g., Yeoksam-dong) based on the location information, the processor 660 may select a third task as a task to be performed. For example, a first task with a first location registered by a first coffee business operator as an execution condition and a second task with a second location registered by a second coffee business operator as an execution condition may be mapped to recognized text 'Americano'. In this case, the processor 660 may identify the location information of the user terminal 600, select the first task as a task to be performed when the user terminal 600 is positioned at the first location, and select the second task as a task to be performed when the user terminal 600 is positioned at the second location.

According to an embodiment, when a fourth task set to be performed in a state (i.e., a running state) in which a first application (or first service) is being executed is included in a plurality of tasks mapped to the recognized text, the processor 660 may obtain information capable of identifying an execution state of the first application (or first service). When the processor 660 identifies that the first application (or first service) is being executed based on the obtained information, the processor 660 may select the fourth task as a task to be performed.

According to an embodiment, when a fifth task set to be performed in a state in which a domain is specified is included in the plurality of tasks mapped to the recognized text, the processor 660 may determine whether the domain is specified based on context information. When the domain is specified, the processor 660 may select the fifth task as a task to be performed. The processor 660 may determine whether a domain is specified based on a speech input or a user input to specify a domain before a speech input corresponding to the recognized text.

According to an embodiment, when a sixth task set to be performed in a state in which a first screen is displayed is included in the plurality of tasks mapped to the recognized text, the processor 660 may identify screen-related information output on the display 640. For example, the first screen may be a screen including first business operator information (e.g., a business operator logo, a business operator name, a business operator URL). In this case, the processor 660 may determine the sixth task as a task to be performed when identifying the first business operator information from the screen-related information.

According to an embodiment, when a seventh task set to be performed when a Wi-Fi state is in a first state (e.g., an ON state, a state in which specified AP information is found) is included in the plurality of tasks mapped to the recognized text, the processor 660 may obtain Wi-Fi state information using the communication circuit 610. When the processor 660 identifies that the WiFi state is the first state based on the WiFi state information, the processor 660 may determine the seventh task as a task to be performed. For example, the seventh task may be a task set to be performed while a specific access point (AP) is being searched for. In this case, the processor 660 may determine whether specific AP information (e.g., a unique identifier) is found using the communication circuit 610, and when the specific AP information is found, determine the seventh task as a task to be performed.

According to an embodiment, the plurality of tasks mapped to the recognized text may include an eighth task set to be performed during a first specified period and a ninth task set to be performed during a second specified period. In this case, when a current time belongs to the first specified period, the processor 660 may select the eighth task as a task to be performed. When a current time belongs to the second specified period, the processor 660 may select the ninth task as a task to be performed.

According to an embodiment, the plurality of tasks mapped to the recognized text 'Americano may include a ninth task of which execution conditions include a state in which a specific coffee shop Wi-Fi or Bluetooth has been discovered, location information of a specific coffee shop, and an order history for the specific coffee shop. In this case, the processor 660 may determine whether the Wi-Fi or Bluetooth of a specific coffee shop has been discovered based on the Wi-Fi state information, and determine whether the user terminal 600 is positioned at the location of the specific coffee shop based on the location information of the user terminal 600 or whether there is an order history for the specific coffee shop based on a service usage history of the user terminal 600. The processor 660 may determine the ninth task as a task to be performed when the Wi-Fi or Bluetooth of the specific coffee shop has been discovered, the user terminal 600 is positioned at a location of the specific coffee shop, and there is the order history for the specific coffee shop.

According to an embodiment, in the process of selecting a task mapped to the recognized text that is a quick command, the processor 660 may identify use setting information of a task mapped to quick commands or a quick command, and select a task mapped to the quick command from tasks set to be used from among a plurality of tasks based on the use setting information.

According to an embodiment, the processor 660 may obtain or identify at least one of context information related to the user terminal 600, execution condition information related to a quick command, and use setting information mapped to the quick command, and, when it is determined that it is hard to select a task mapped to the recognized text that is a quick command, based on the context information, the execution condition information and the use setting information, output a screen for inducing a user to select one of the plurality of tasks.

According to various embodiments, the processor 660 may provide a shortcut screen or a shortcut icon for performing a task mapped to a registered quick command based on a touch input. The shortcut screen or icon may cause a task mapped to a quick command to be performed based on, for example, a user input to the shortcut screen or icon.

According to various embodiments, the processor 660 may determine whether the recognized text corresponds to the quick command by using the quick command stored in the intelligent server 2200. For example, the processor 660 may specify a domain through the intelligent server 2200, the intelligent server 2200 may search for a quick command matching the recognized text using quick commands belonging to the specified domain, and transmit the found quick command and a command list related to the quick command to the user terminal 600.

According to the above-described embodiment, when there are a plurality of tasks mapped to the recognized text that is a quick command, the user terminal 600 may select one task more suitable for the situation of the user terminal 600 from among the plurality of tasks.

According to an embodiment, the electronic device (e.g., the user terminal 600 of FIG. 6) may include a display (e.g., the display 640 of FIG. 6), a microphone (e.g., the microphone 620 in FIG. 6), a wireless communication circuit (e.g., the communication circuit 610 in FIG. 6), a processor (e.g., the processor 660 of FIG. 6) operatively connected to the display, the microphone, and the communication circuit, and a memory (e.g., the memory 650 of FIG. 6) operatively connected to the processor. The memory may store a plurality of, user-customized tasks mapped to one of a selected word, phrase or sentence, and store instructions which, when executed, cause the processor to receive a first speech input according to utterance of the user through the microphone, obtain context information related to the electronic device when one of the word, phrase or sentence is included in the first speech input, select one of the plurality of tasks based at least in part on the context information, and perform the selected one task using at least a part of the electronic device.

According to an embodiment, the customized task may include a plurality of actions. The customized task may include a plurality of actions using a plurality of application programs.

According to an embodiment, the context information may include at least one of location information of the electronic device, application or service information used in the electronic device, session information of the electronic device, di splay information of the electronic device, or Wi-Fi state information of the electronic device.

According to an embodiment, the instructions may cause the processor to identify use setting information related to the plurality of tasks, obtain at least one task set to be used from among the plurality of tasks based on the use setting information, and select the one task from the at least one task.

According to an embodiment, the instructions may cause the processor to identify execution condition information related to the plurality of tasks, and select the one task set to be performed in a context of the electronic device according to the context information from among the plurality of tasks based on the execution condition information.

According to an embodiment, when a first task set to be performed at a specified location is included in the plurality of tasks, the instructions may cause the processor to select the first task from among the plurality of tasks when it is identified that the electronic device is positioned at the specified location based on the context information.

According to an embodiment, when a second task set to be performed in a state in which a first application or a first service is being executed is included in the plurality of tasks, the instructions may cause the processor to select the second task from among the plurality of tasks when it is identified that the first application or the first service is being executed, based on the context information.

According to an embodiment, when a third task set to be performed in a state in which a first domain is specified is included in the plurality of tasks, the instructions may cause the processor to select the third task from among the plurality of tasks when it is identified that the first domain is specified based on the context information.

According to an embodiment, when a fourth task set to be performed in a state in which a first screen is displayed on the display is included in the plurality of tasks, the instructions may cause the processor to select the fourth task from among the plurality of tasks when it is identified that the first screen is displayed on the display based on the context information.

According to an embodiment, when a fifth task set to be performed in a state in which a Wi-Fi state is a first state included in the plurality of tasks, the instructions may cause the processor to select the fifth task when it is identified that the Wi-Fi state is the first state, based on the context information.

According to an embodiment, the instructions may cause the processor to output a screen for guiding a selection for one task of the plurality of tasks when it is hard to select the one task.

According to an embodiment, a system (e.g., the speech recognition-based task performing system of FIG. 1) may include a display (e.g., the display 640 of FIG. 6), a microphone (e.g., the microphone 620 in FIG. 6), at least one processor (e.g., at least one of the first quick command manager 230 of FIG. 3 and the processor 660 of FIG. 6), and at least one memory (e.g., at least one of the database 300 of FIG. 2 and the memory 650 of FIG. 6). The memory may be configured to store a plurality of, user-customized tasks mapped to one of a selected word, phrase or sentence, and store instructions which, when executed, cause the processor to receive a first speech input through the microphone, obtain context information related to the electronic device when one of the word, phrase or sentence is included in the first speech input, select one of the plurality of tasks based at least in part on the context information, and perform the selected one task.

According to an embodiment, the instructions may cause the at least one processor to identify execution condition information related to the plurality of tasks, and select the one task set to be performed in a context of the electronic device according to the context information from among the plurality of tasks based on the execution condition information.

According to an embodiment, when a first task set to be performed at a specified location is included in the plurality of tasks, the instructions may cause the at least one processor to select the first task from among the plurality of tasks when it is identified that the electronic device is positioned at the specified location based on the context information.

According to an embodiment, when a second task set to be performed in a state in which a first application or a first service is being executed is included in the plurality of tasks, the instructions may cause the at least one processor to select the second task from among the plurality of tasks when it is identified that the first application or the first service is being executed, based on the context information.

According to an embodiment, when a third task set to be performed in a state in which a first domain is specified is included in the plurality of tasks, the instructions may cause the at least one processor to select the third task from among the plurality of tasks when it is identified that the first domain is specified based on the context information.

According to an embodiment, when a fourth task set to be performed in a state in which a first screen is displayed on the display is included in the plurality of tasks, the instructions may cause the at least one processor to select the fourth task from among the plurality of tasks when it is identified that the first screen is displayed on the display based on the context information.

According to an embodiment, when a fifth task set to be performed in a state in which a Wi-Fi state is a first state is included in the plurality of tasks, the instructions may cause the at least one processor to select the fifth task when it is identified that the Wi-Fi state is the first state, based on the context information.

Figure 7:
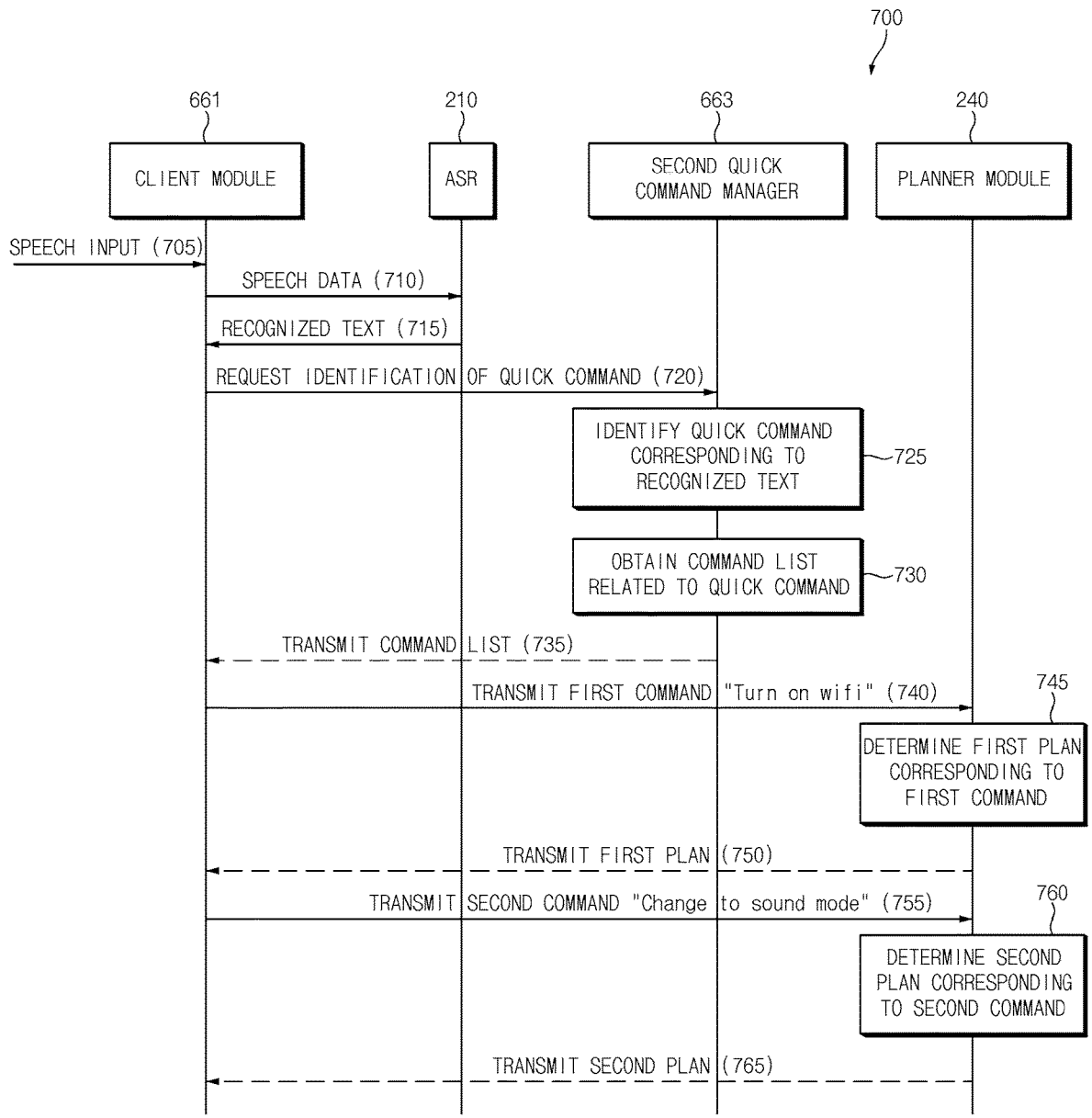
FIG. 7 illustrates a method of processing a quick command in a user terminal, according to an embodiment.

FIG. 7 illustrates a method 700 for processing a quick command in a user terminal (e.g., the user terminal 600 of FIG. 6) according to an embodiment.

Referring to FIG. 7, in operation 705, the client module 661 may convert a received speech input into speech data when receiving the speech input.

In operation 710, the client module 661 may transmit the speech data to the intelligent server 2200.

In operation 715, the ASR 2210 may recognize text from the speech data by converting the speech data to text, and transmit the recognized text to the user terminal 600.

In operation 720, the client module 661 may receive the recognized text, and request the second quick command manager 663 to determine whether the recognized text corresponds to a quick command.

In operation 725, the second quick command manager 663 may determine that the recognized text is a quick command when a quick command corresponding to the recognized text has been found from a quick command list stored in the memory 650.

In operation 730, the second quick command manager 663 may obtain a command list related to the quick command. For example, the second quick command manager 663 may obtain a command list including "Turn on WiFi" and "Change to sound mode", which are related to the quick command "company" from the database 300.

In operation 735, the second quick command manager 663 may transmit a command list related to the obtained quick command to the client module 661.

In operation 740, the client module 661 may transmit a first command (e.g., Turn on WiFi) having a first execution priority included in the received command list to the intelligent server 2200 when receiving the command list related to the quick command.

In operation 745, when receiving the first command, the intelligent server 2200 may determine a first plan corresponding to the first command and transmit the determined first plan to the user terminal 600 in operation 750.

In operation 755, when receiving the first plan, the client module 661 of the user terminal 600 may transmit a second command (e.g., change to sound mode) having a second execution priority included in the command list to the intelligent server 2200. The client module 661 may perform an action corresponding to the first command according to the first plan when receiving the first plan.

In operation 760, when receiving the second command, the intelligent server 2200 may determine a second plan corresponding to the second command and transmit the determined second plan to the user terminal 600 in operation 765. When receiving the second plan, the client module 661 may perform an action corresponding to the second command according to the second plan.

Figure 8:
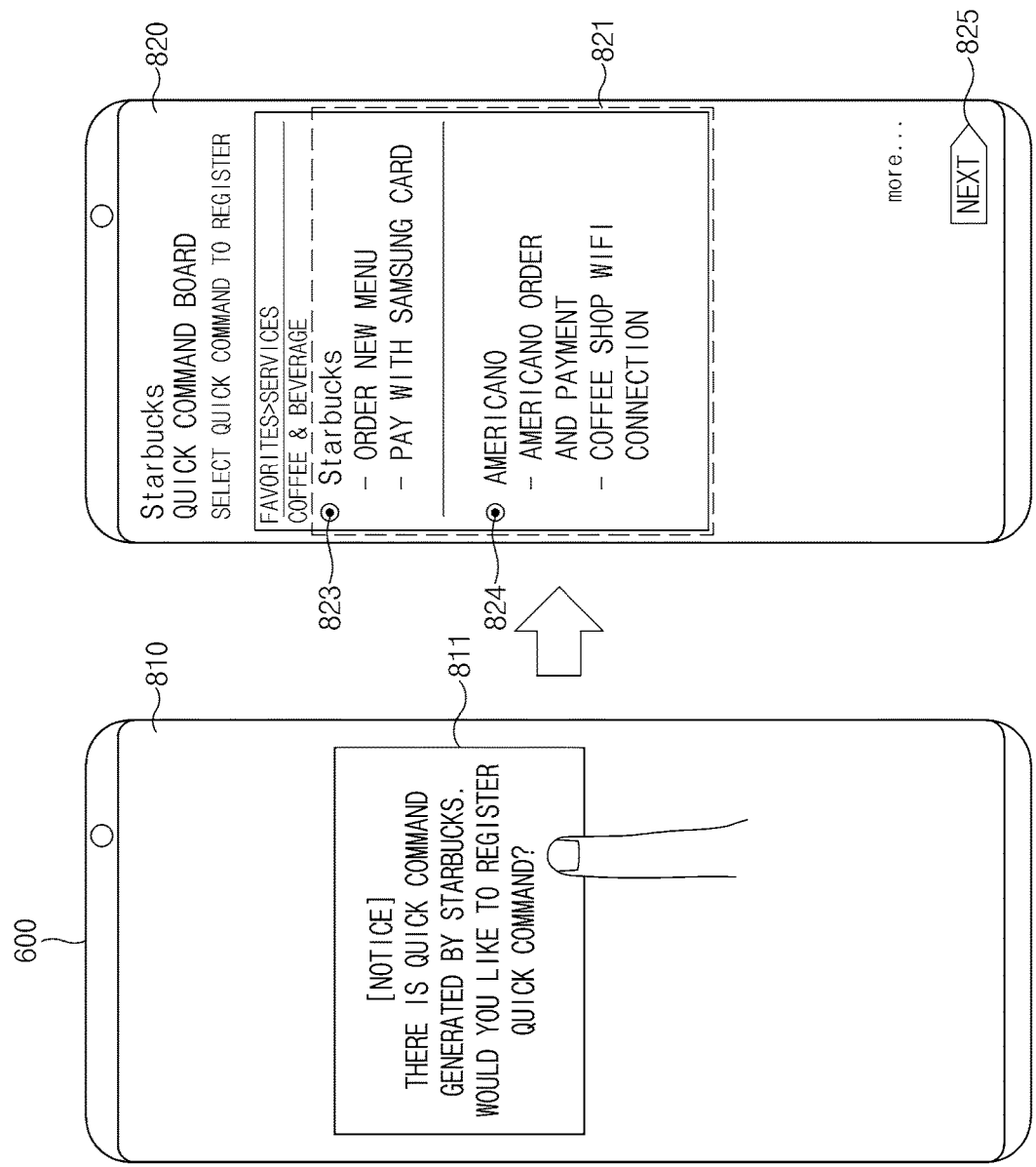
FIG. 8 illustrates a UI screen for describing a method of registering a quick command based on a push service according to an embodiment.

FIG. 8 illustrates a UI screen for describing a method of registering a quick command based on a push service according to an embodiment.

Referring to FIG. 8, on screen 810, the user terminal 600 may receive notification information for inducing registration of a quick command generated by a Starbucks operator from the intelligent server 2200 or a push service server (not shown), and display a notification window 811 based on the notification information. For example, the intelligent server 2200 or a push service server (not shown) may identify a time point when the notification information is to be transmitted to the user terminal 600 based on the execution condition information related to the generated quick command, and transmit notification information to the user terminal 600 at the identified time point. For another example, the intelligent server 2200 or the push service server (not shown) may periodically obtain context information related to the user terminal 600, and determine whether the context of the user terminal 600 according to the obtained context information meets an execution condition according to the execution condition information related to the generated quick command. The notification information may be transmitted to the user terminal 600 when the context of the user terminal 600 meets the execution condition.

On screen 810, when the user terminal 600 identifies an input (e.g., touch) for the notification window 811, the user terminal 600 may display an interface for registering a quick command on the screen 820. The screen 820 may include, for example, a quick command list 821 generated by a Starbucks operator, buttons 823 and 824 for selecting each quick command, and a button 825 for requesting registration of the selected quick command.

On screen 820, the user terminal 600 may identify an input to the button 825 requesting registration of two quick commands 'Starbucks' and 'Americano' selected through the button 823 and the button 824. Then, the user terminal 600 may associate a quick command 'Starbucks' and a command list including 'order new menu' and 'pay with Samsung card' with each other and store the same in the memory 650. In addition, the user terminal 600 may associate the quick command "Americano" with the command list including "Americano order and payment" and "Coffee shop WiFi connection" and store the quick command and the command list in the memory 650.

Figure 9A:
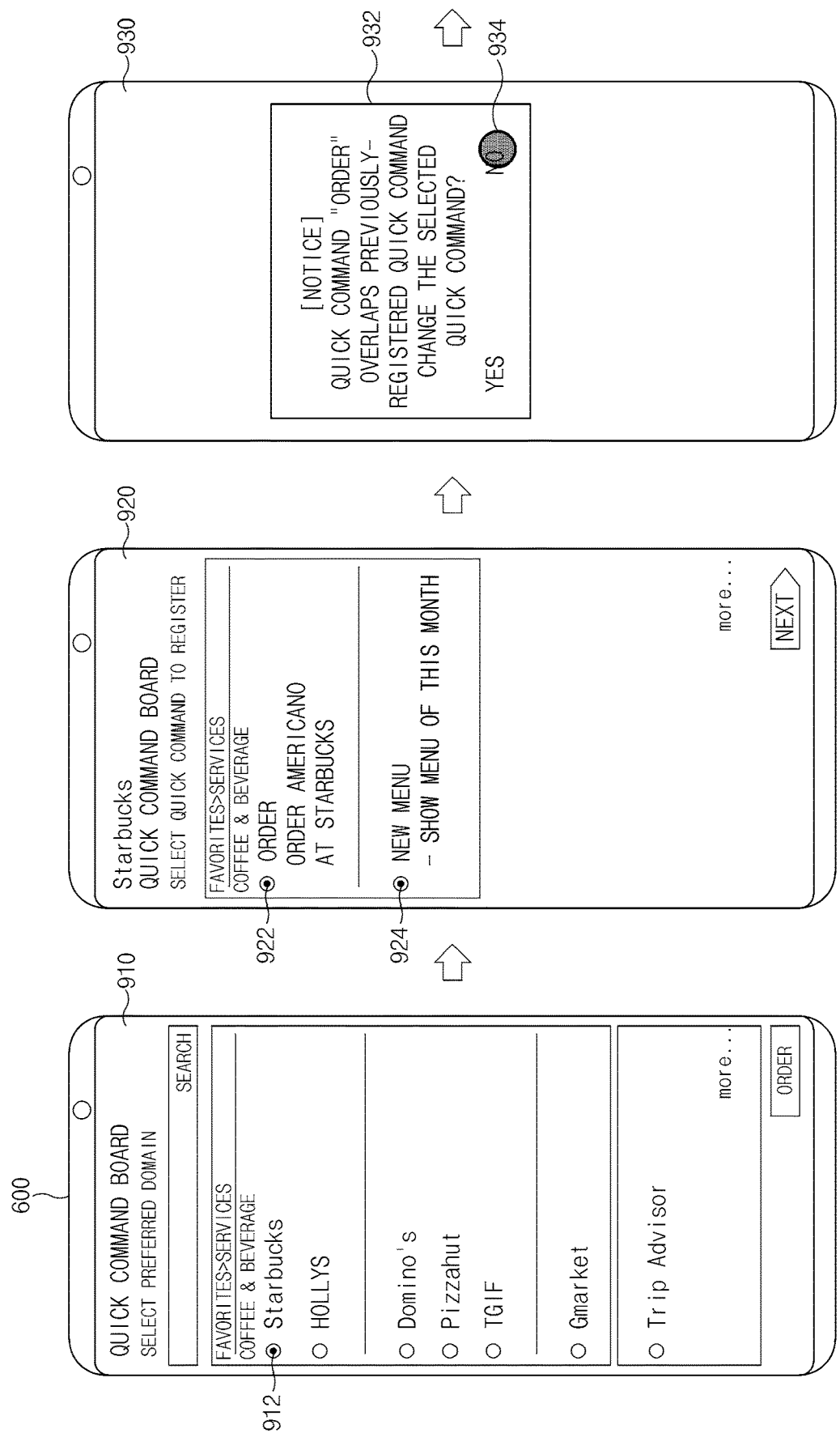
FIG. 9A illustrates a UI screen for describing a method of registering a quick command mapped to a plurality of tasks according to an exemplary embodiment.
Figure 9B:
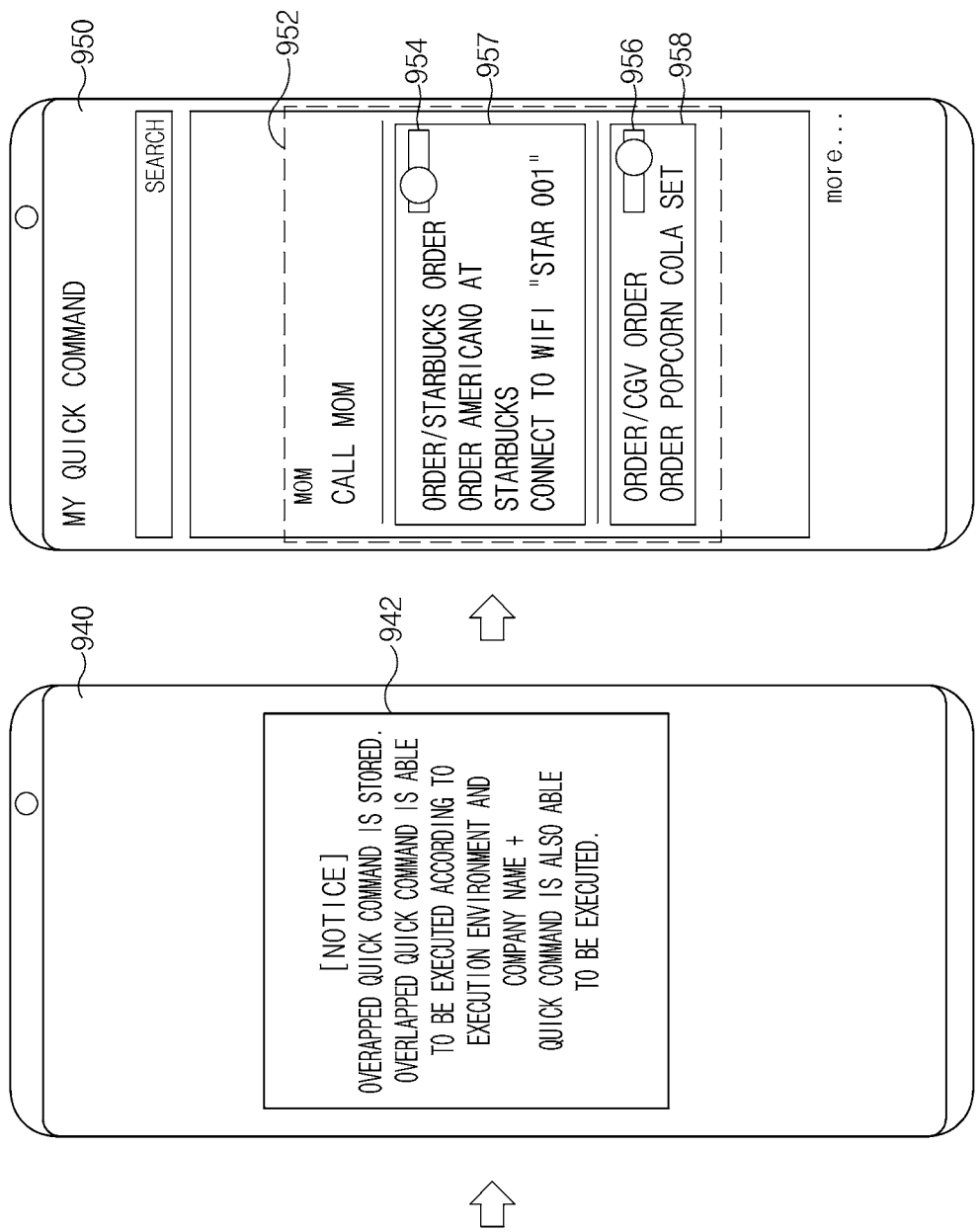
FIG. 9B illustrates a UI screen for describing a method of registering a quick command mapped to a plurality of tasks according to an exemplary embodiment.

FIGS. 9A to 9B illustrate UI screens for describing a method of registering a quick command mapped to a plurality of tasks according to an exemplary embodiment.

Referring to FIGS. 9A to 9B, the user terminal 600 may display a list of domains to which quick commands belong on screen 910 according to an input requesting a list of quick commands. For example, the user terminal 600 may request a list of quick commands from the intelligent server 2200 when identifying an input for requesting quick command recommendation. The intelligent server 2200 may transmit a list of domains to which the quick commands belong in response to the request and the user terminal 600 may display the received list of domains.

On screen 910, when a domain Starbucks is selected from the list of domains (912), the user terminal 600 may display a list of quick commands belonging to the Starbucks domain (e.g., 'order' and 'new menu') on screen 920. For example, the user terminal 600 may request a list of quick commands belonging to the Starbucks domain to the intelligent server 2200, and receive and display the list of quick commands belonging to the Starbucks domain from the intelligent server 2200.

On screen 920, when at least one quick command (e.g., 'Order 922' and 'New Menu 924') is selected from the list of quick commands belonging to the Starbucks domain, the user terminal 600 may determine whether the selected quick command overlaps a previously-registered quick command.

On the screen 930, the user terminal 600 may display a notification window 932 when the selected quick command overlaps a previously-registered quick command. The notification window 932 may include, for example, a query about whether to change the selected quick command because the selected quick command overlaps the previously-registered quick command.

On screen 930, when the user terminal 600 identifies an input 934 that does not agree to the change of the selected quick command, the user terminal 600 may store the selected quick commands 'order' and 'new menu' on the screen 940, and display a notification window 942 indicating that the storage of the selected quick commands 'order' and 'new menu' is performed. The notification window 942 may include, for example, contents indicating that quick commands mapped to different tasks are selectively executed according to a context environment related to the user terminal 600.

On screen 950, the user terminal 600 may display a quick command list 952 including quick commands which have been registered. On screen 950, the user terminal 600 may display buttons 954 and 956 for setting of whether to use overlapping quick commands. When displaying the quick command list 952, the user terminal 600 may display detail information (e.g., a list of commands related to the quick command) on quick commands using the same text. For example, the user terminal 600 may identify the quick command 'order' 957 on the left of which a bar included in the button 954 is located, as a quick command set to be used, and store use setting information indicating that the 'order' 957 is set to be used, in association with 'order' 957. For another example, the user terminal 600 may identify the quick command 'order' 958 on the right of which a bar included in the button 956 is located, as a quick command set not to be used, and store use setting information indicating that the 'order' 958 is set not to be used in association with 'order' 958.

Figure 10:
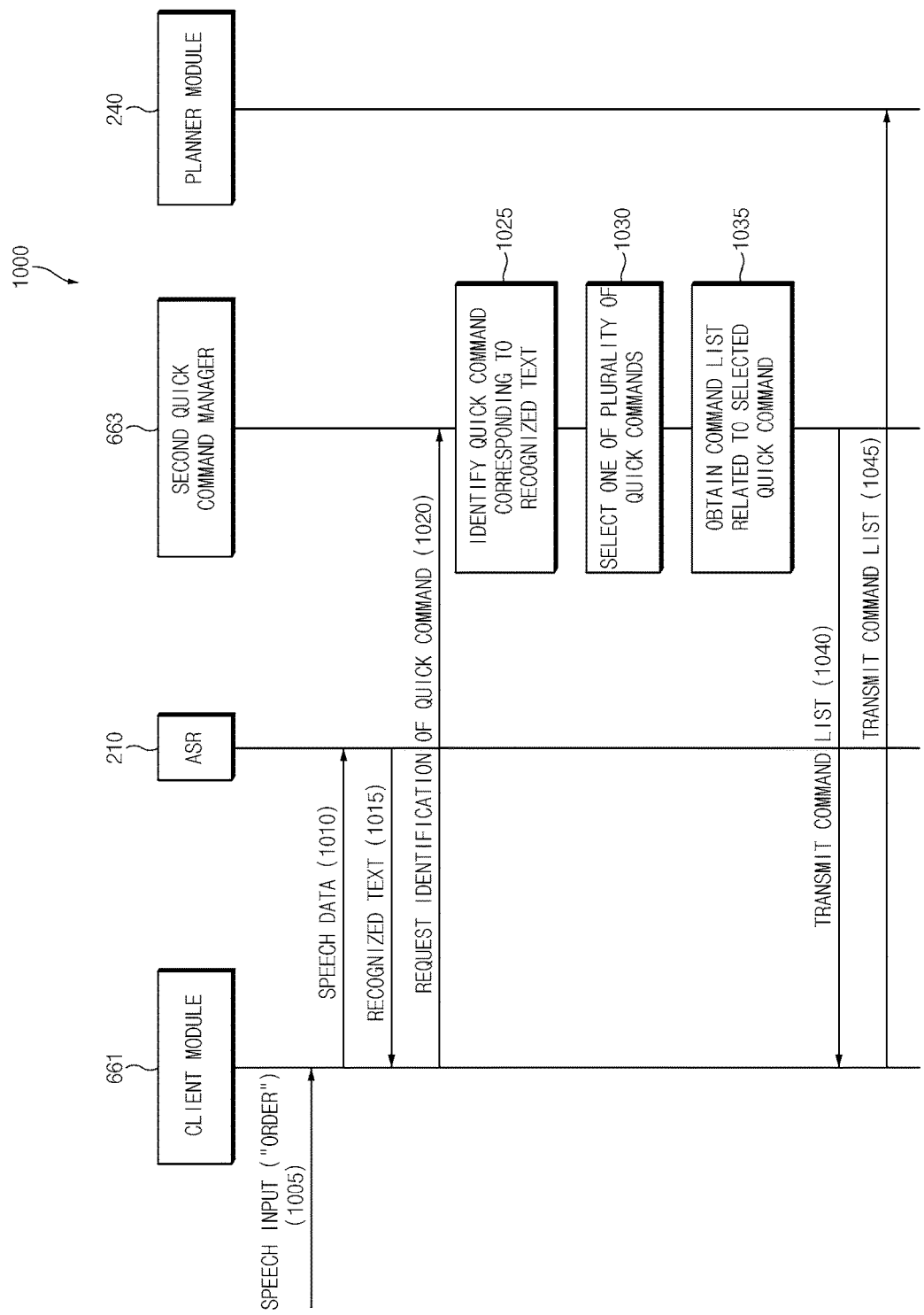
FIG. 10 illustrates a method of selecting one quick command from among a plurality of overlapping quick commands according to an embodiment.

FIG. 10 illustrates a method 1000 of selecting one quick command from among a plurality of overlapping quick commands according to an embodiment.

Referring to FIG. 10, in operations 1005 and 1010, when receiving a speech input, the client module 661 may convert a speech input into speech data and transmit the speech data to the intelligent server 2200. In operation 1015, the ASR 2210 may recognize text from the speech data and transmit the recognized text to the user terminal 600.

In operation 1020, when receiving the recognized text from the ASR 2210, the client module 661 may request the second quick command manager 663 to determine whether the recognized text corresponds to a quick command.

In operation 1025, the second quick command manager 663 may search for a plurality of quick commands matching the recognized text from the memory 650. When a plurality of quick commands matching the recognized text are found, it may mean that there are a plurality of tasks mapped to the quick commands matching the recognized text in the memory 650.

In operation 1030, the second quick command manager 663 may select one quick command from among the plurality of quick commands based on context information related to the user terminal 600 and execution condition information related to the plurality of quick commands. For example, the second quick command manager 663 may select a quick command set to be executed in the context of the user terminal 600 corresponding to context information among a plurality of quick commands based on execution information related to the plurality of quick commands.

In operation 1035, the second quick command manager 663 may obtain a command list related to the quick command.

In operation 1040, the second quick command manager 663 may transmit the command list related to the quick command to the client module 661.

In operation 1045, the client module 661 may perform a task mapped to the quick command based on a command list related to the quick command. For example, the client module 661 may transmit a command list related to the quick command to the planner module 2240, receive a plan for performing a task corresponding to the transmitted command list, and perform a task mapped to the quick command according to the received plan.

According to various embodiments, in operation 1020, the second quick command manager 663 may request the first quick command manager 2230 to search for a plurality of quick commands that match the recognized text from the database 300.

Figure 11:
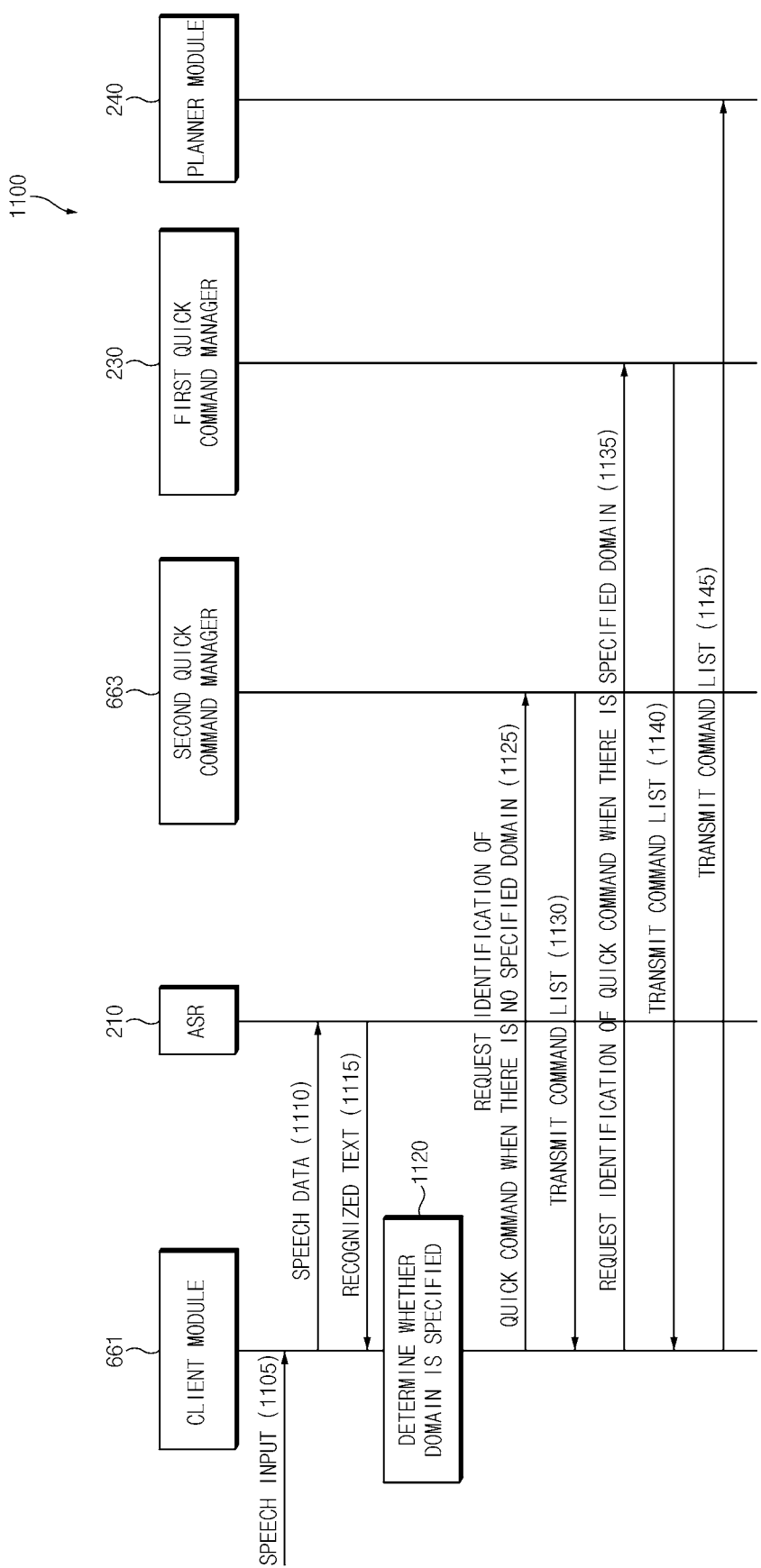
FIG. 11 illustrates a method of requesting a quick command according to whether or not a domain is specified according to an embodiment.

FIG. 11 illustrates a method 1100 of requesting a quick command according to whether or not a domain is specified according to an embodiment.

Referring to FIG. 11, in operations 1105 and 1110, when receiving a speech input, the client module 661 may convert a speech input into speech data and transmit the speech data to the intelligent server 2200. In operation 1115, the ASR 2210 may recognize text from the speech data and transmit the recognized text to the user terminal 600.

In operation 1120, the client module 661 may determine whether a specified domain exists by using the intelligent server 2200. For example, the client module 661 may determine whether there is a specified domain through a previous speech input of operation 1105. The previous speech input may include a speech input including a domain name, such as "Starbucks open".

In operation 1125, the client module 661 may request the second quick command manager 663 to determine whether the recognized text corresponds to a quick command when the specified domain does not exist in operation 1120.

In operation 1130, when the recognized text corresponds to the quick command, the second quick command manager 663 may transmit a command list related to the recognized quick command to the client module 661 as a response to the recognized text. For example, the second quick command manager 663 may search for a quick command that matches the recognized text from the memory 650 and, when there is a quick command found, transmit a command list related to the found quick command.

In operation 1135, the client module 661 may request the first quick command manager 2230 to determine whether the recognized text corresponds to a quick command when a specified domain exists in operation 1120.

In operation 1140, the first quick command manager 2230 may obtain a command list related to the recognized quick command, and transmit the obtained command list to the client module 661 when the recognized text corresponds to the quick command. For example, the first quick command manager 2230 may search for a quick command that matches the recognized text from the database 300, when the found quick command exists, obtain a command list related to the found quick command, and transmit the obtained command list to the client module 661.

In operation 1145, the client module 661 may perform a task mapped to the quick command based on a command list related to the quick command. For example, the client module 661 may transmit a command list related to the quick command to the planner module 2240, receive a plan for performing an action corresponding to the transmitted command list from the planner module 2240 as a response thereto, and perform a task mapped to the quick command according to the received plan.

Figure 13:
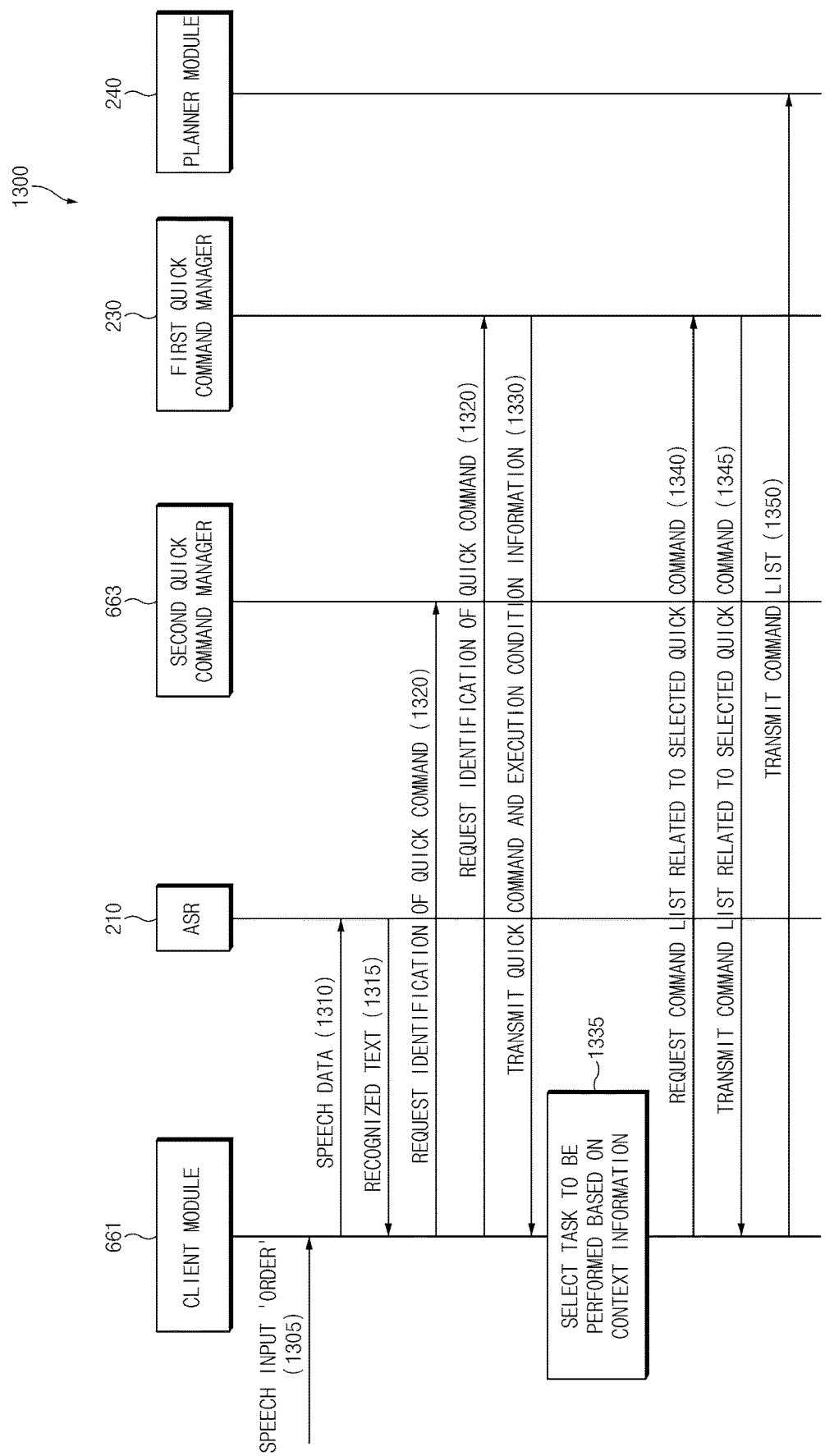
FIG. 13 illustrates a method of selecting a quick command based on location information according to an embodiment.

FIG. 12 is an exemplary diagram of a plurality of quick commands using the same text according to an embodiment, and FIG. 13 illustrates a method 1300 of selecting a quick command based on location information according to an embodiment.

Referring to FIG. 12, the database 300 or the memory 650 of the user terminal 600 may include a plurality of quick commands 1210 and 1220 using text 'order'. The quick command 'order' 1210 may be related to a command list of "New menu order" and "Samsung card payment" belonging to a Starbucks domain. The quick command 'order' 1220 may be related to a command list of "order popcorn cola set with Samsung Pay" belonging to a CGV domain. The quick command 'order' 1210 does not have execution condition information set, and the quick command 'order' 1220 may be related to execution condition information set to be executed at a specified location.

Referring to FIGS. 12 and 13, in operations 1305 and 1310, when receiving a speech input 'order', the client module 661 may convert a speech input into speech data and transmit the speech data to the intelligent server 2200. In operation 1315, the ASR 2210 may recognize text 'order' from the speech data and transmit the recognized text to the user terminal 600.

In operation 1320, the client module 661 may request the first quick command manager 2230 and the second quick command manager 663 to determine whether the recognized text 'order' corresponds to a quick command. Operations after operation 1320 will be described by taking, as an example, a situation in which the second quick command manager 663 does not transmit a response corresponding to the recognized text.

In operation 1330, the second quick command manager 663 may determine whether the text recognized from the database 300 corresponds to a quick command. For example, the second quick command manager 663 may search for a plurality of quick commands 'order' 1210 and 1220 that match the recognized text from the database 300. In this case, the second quick command manager 663 may transmit the found quick commands 'order' 1210 and 1220 and execution condition information (e.g., GPS Information related to 'order' 1220) related to the quick commands 'order' 1210 and 1220 to the client module 661.

In operation 1335, when the client module 661 receives the quick commands 'order' 1210 and 1220 and the execution condition information related to the quick commands 'order' 1210 and 1220 from the second quick command manager 663, the client module 661 may obtain context information related to the user terminal 600. The client module 661 may select a quick command set to be executed in the context of the user terminal 600 according to the context information based on the execution condition information. For example, the client module 661 may identify that the quick command 1220 is set to be executed at a specified location from the execution condition information related to the quick command 'order' 1220. Then, the client module 661 may determine whether the user terminal 600 is in the specified location based on the location information of the user terminal 600, and, when the user terminal 600 is in the specified location, select a task mapped to the quick command 'order' 1220 as a task to be executed.

In operation 1340, the client module 661 may request a command list related to the selected quick command from the first quick command manager 2230.

In operation 1345, the first quick command manager 2230 may transmit the command list related to the selected quick command to the client module 661 in response to the request. For example, the second quick command manager 663 may transmit the command list related to the determined quick command from among the plurality of quick commands 1210 and 1220 found in operation 1330.

In operation 1350, the client module 661 may perform a task mapped to the quick command based on a command list related to the quick command. For example, the client module 661 may transmit a command list related to the quick command to the planner module 2240, receive a plan corresponding to the transmitted command list, and perform a task mapped to the quick command according to the received plan.

According to various embodiments, in operation 1320, the client module 661 may transmit context information related to the user terminal 600 when requesting the first quick command manager 2230 to determine whether text 'order' recognized by the first quick command manager 2230 corresponds to a quick command. Then, the first quick command manager 2230 may select one quick command from among the plurality of quick commands based on context information related to the user terminal 600 when there are a plurality of quick commands matching the recognized text.

According to various embodiments, in operations 1330 to 1335, the first quick command manager 2230 may request location information of the user terminal 600 from the client module 661 when there are a plurality of tasks mapped to a quick command matching the recognized text. The first quick command manager 2230 may receive the location information from the client module 661 and select one task from among the plurality of tasks mapped to the quick command based on the location information.

Figure 14:
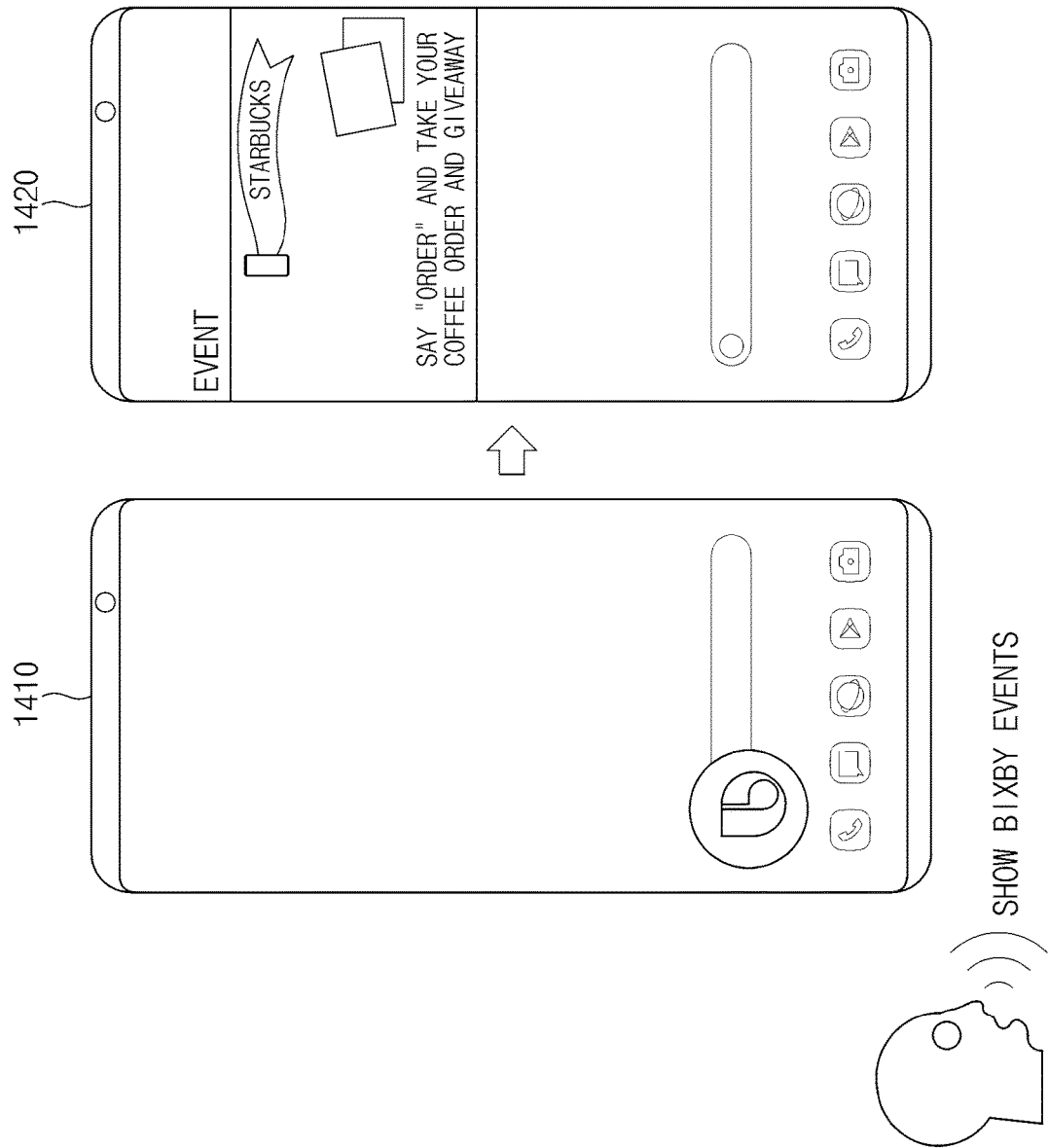
FIG. 14 is an exemplary diagram of display information according to an embodiment.
Figure 15:
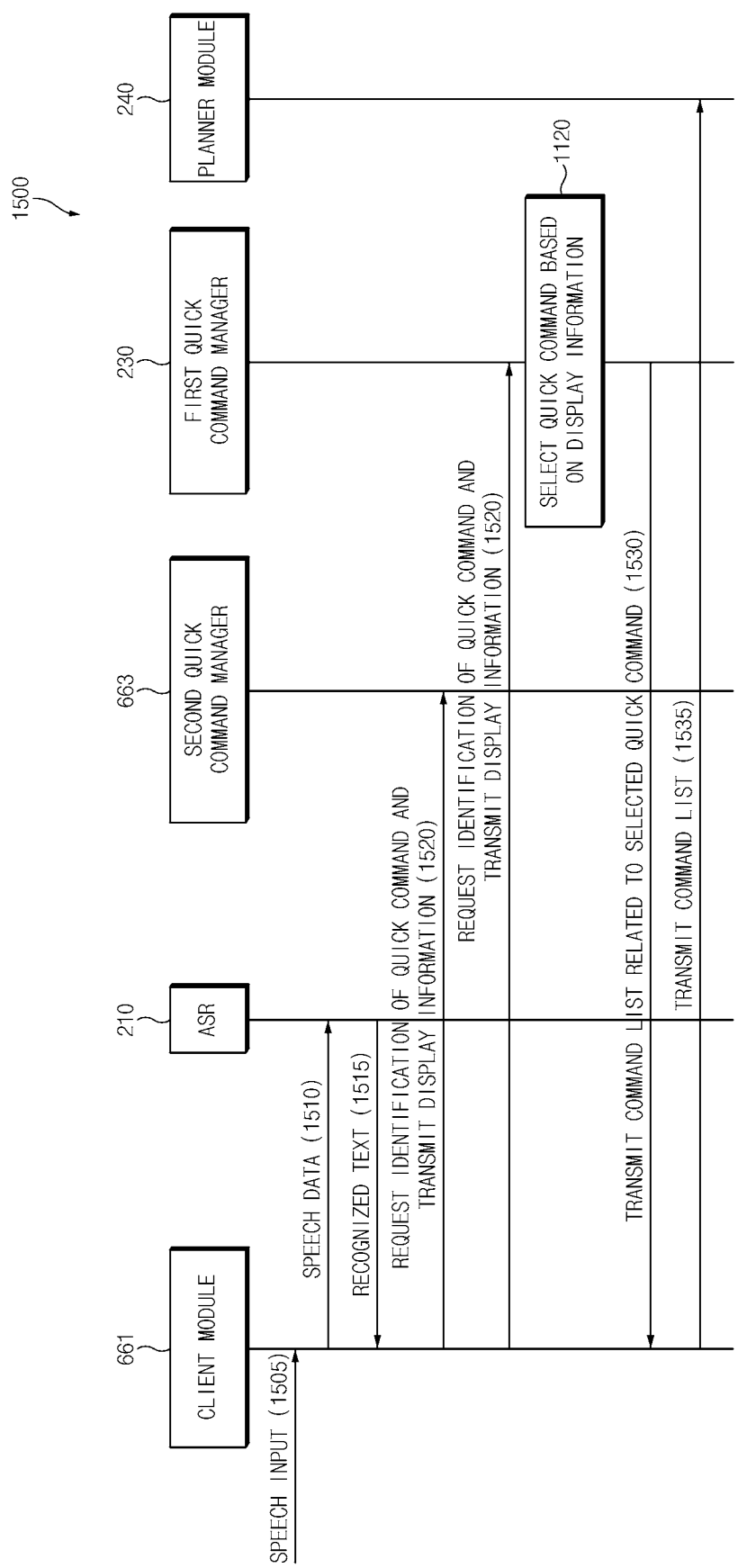
FIG. 15 illustrates a method of selecting a quick command based on display information according to an embodiment.

FIG. 14 is an exemplary diagram of display information according to an embodiment, and FIG. 15 illustrates a method 1500 of selecting a quick command based on display information according to an embodiment.

Referring to FIG. 14, when receiving a speech input "Show Bixby event" on screen 1410 (e.g., home screen), the client module 661 may determine an action corresponding to the speech input. In this process, the client module 661 may cooperate with the intelligent server 2200. For example, on screen 1410, the determined action may be to execute an intelligent app and display event information provided by the intelligent server 2200 through the intelligent app.

On screen 1420, the client module 661 may execute an intelligent app corresponding to a speech input, receive event information provided by the intelligent server 2200 through the intelligent app, and display the received event information on a display.

Referring to FIGS. 14 and 15, in operations 1505 and 1510, when receiving a speech input 'order', the client module 661 may convert a speech input into speech data and transmit the speech data to the intelligent server 2200. In operation 1515, the ASR 2210 may recognize text 'order' from the speech data and transmit the recognized text 'order' to the client module 661.

In operation 1520, the client module 661 may request the first quick command manager 2230 and the second quick command manager 663 to determine whether the recognized text 'order' corresponds to a quick command. The client module 661 may transmit display information when requesting the identification. The display information may include at least one of, for example, screen source information (e.g., URL, registrant information), image information, or text information, as screen-related information displayed on the display 640. For example, the client module 661 may transmit registrant information (e.g., Starbucks) registering event information on screen 1420. Operations after operation 1520 will be described by taking, as an example, a situation in which the second quick command manager 663 does not transmit a response corresponding to the recognized text after receiving the recognized text.

In operation 1525, the first quick command manager 2230 may search for a quick command matching the recognized text by using some of quick commands stored in the database 300 based on the display information. For example, the first quick command manager 2230 may identify registrant information 'Starbucks' from the display information, and search for a quick command matching the recognized text 'order' among quick commands belonging to the 'Starbucks' domain.

In operation 1530, the first quick command manager 2230 may transmit the command list related to the determined quick command to the client module 661 in response to the request. For example, the first quick command manager 2230 may transmit a command list of "new menu order" and "Samsung card payment" related to the found quick command 'order'.

In operation 1535, the client module 661 may perform a task mapped to the quick command based on a command list related to the quick command. For example, the client module 661 may sequentially transmit the received command list of "new menu order" and "Samsung card payment" to the planner module 2240.

Figure 16:
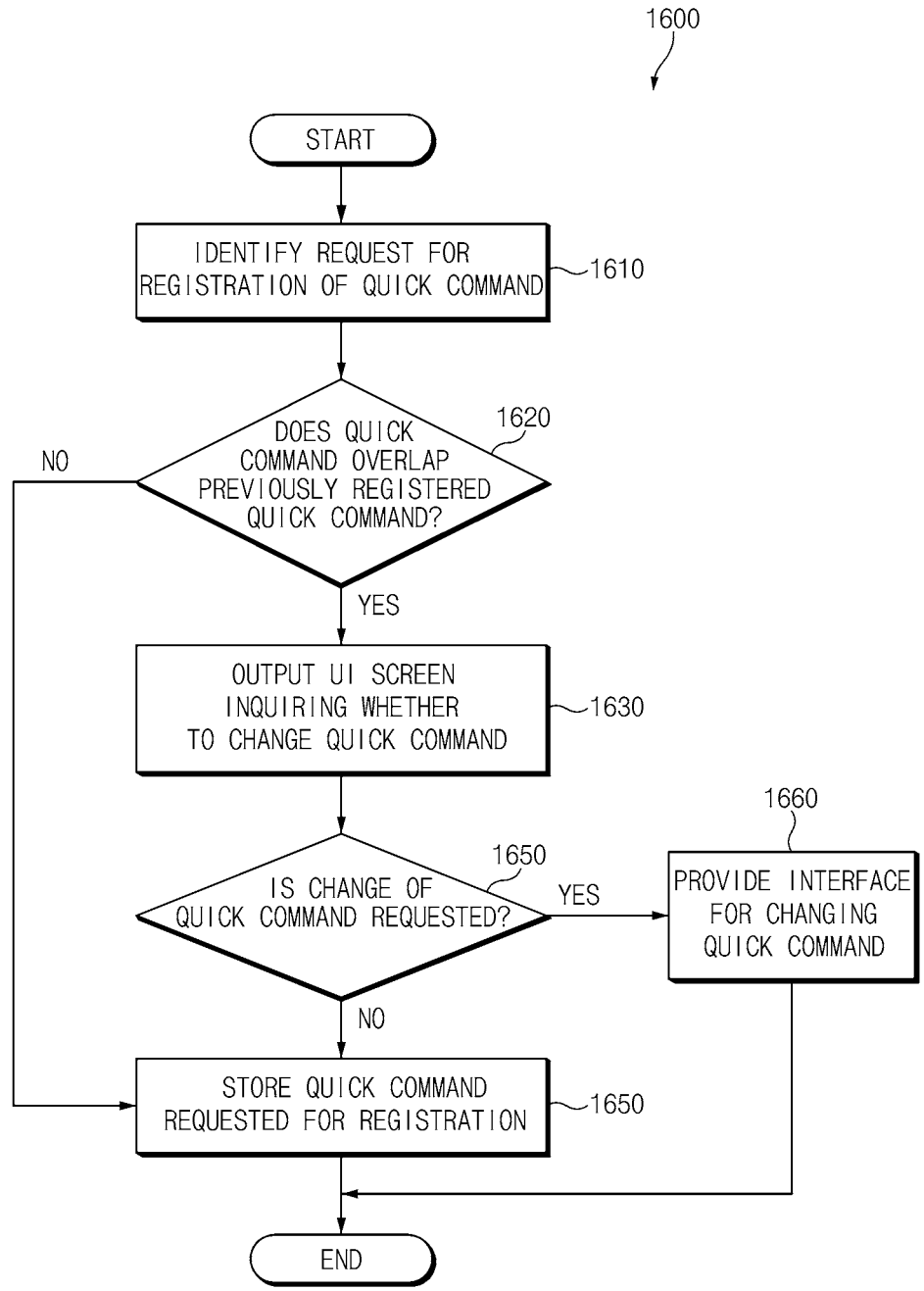
FIG. 16 illustrates a flowchart of a method of registering a quick command according to an embodiment.

FIG. 16 illustrates a flowchart 1600 of a method of registering a quick command according to an embodiment.

Referring to FIG. 16, in operation 1610, the user terminal 600 may identify a registration request for a quick command according to a user input. For example, the user terminal 600 may receive a quick command list that is newly registered through a push service and display the received quick command list on the display 640. The user terminal 600 may identify that at least one quick command is selected from the displayed quick command list and a registration of the selected quick command is requested (see the example of FIG. 8). For another example, the user terminal 600 may identify that one quick command is selected from a recommended quick command list provided from the intelligent server 2200 and registration of the selected quick command is requested (see the example of FIG. 9A or 9B).

In operation 1620, the user terminal 600 may determine whether the quick command requested for registration overlaps a previously-registered quick command. For example, the user terminal 600 may determine whether there is another task previously mapped to text matching the quick command requested for registration.

When the quick command requested for registration overlaps the previously-registered quick command, in operation 1630, the user terminal 600 may display a UI screen for inquiring whether to change the quick command.

In operation 1640, the user terminal 600 may determine whether a response to the displayed UI screen is received. For example, the displayed UI screen may include a consent button (e.g., yes) and a dissent button (e.g., No), and the user terminal 600 may identify for which button among the consent button and the dissent button a user input is received.

In operation 1650, when the user terminal 600 identifies a user input that disagrees with the change of the quick command, the user terminal 600 may store the quick command requested for registration. For example, the user terminal 600 may store the quick command requested for registration and a command list related to the quick command in the memory 650. Thereafter, the user terminal 600 may provide an interface capable of setting use or non-use of at least some of the registered quick commands, for example, overlapping quick commands.

In operation 1660, when the user terminal 600 identifies a user input agreeing to the change of the quick command, the user terminal 600 may provide an interface for changing the quick command requested for registration. When a quick command is changed through the interface provided, the user terminal 600 may store the changed quick command along with a command list related to the quick command.

Figure 17:
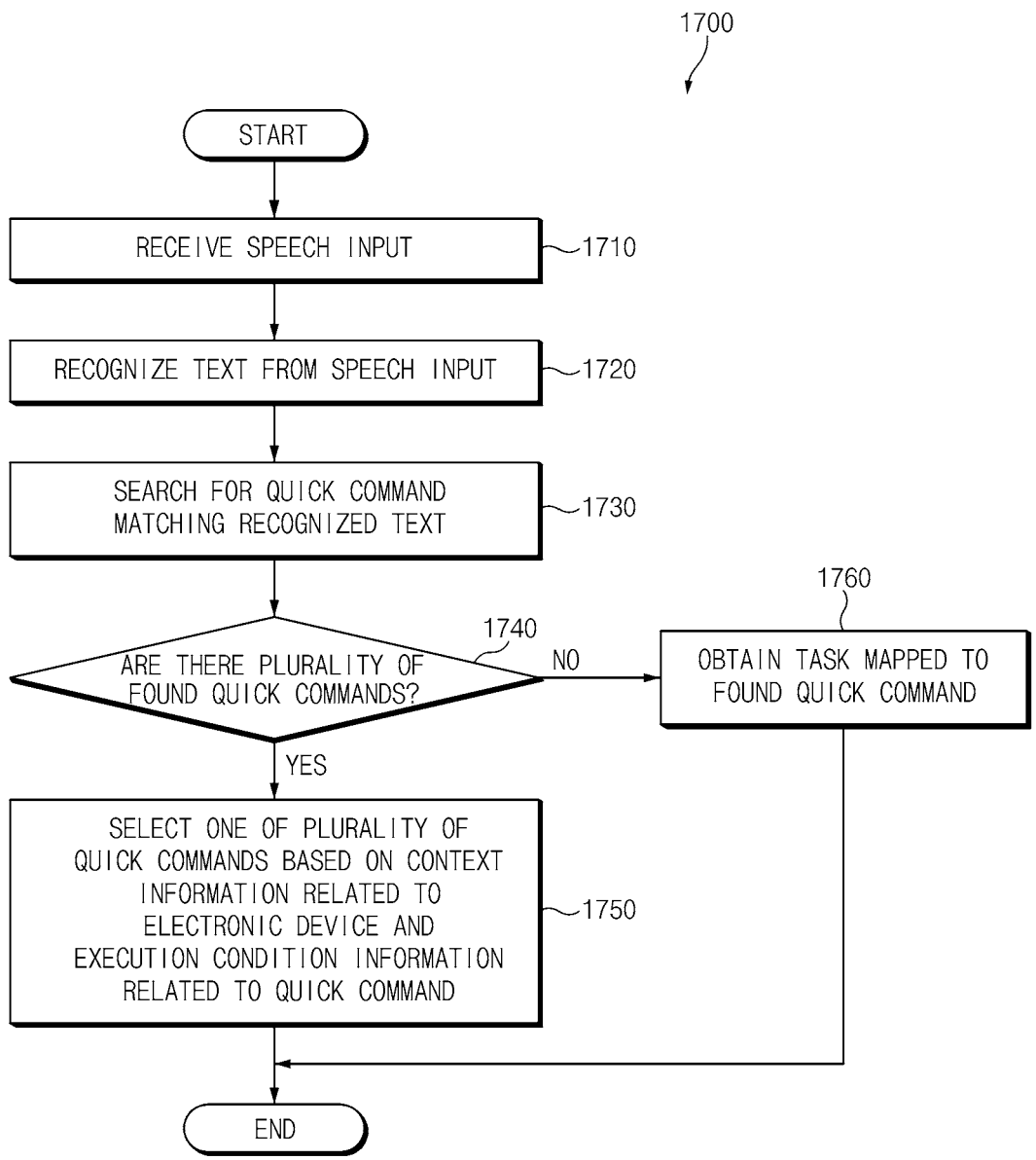
FIG. 17 is a flowchart of a method of selecting a quick command according to an embodiment.

FIG. 17 is a flowchart 1700 of a method of selecting a quick command according to an embodiment.

Referring to FIG. 17, in operation 1710, the user terminal 600 may receive a speech input, and in operation 1720, recognize text from the speech input. For example, when receiving the speech input, the user terminal 600 may convert the speech input into speech data, transmit the speech data to the intelligent server 2200, and receive text recognized from the speech data by the intelligent server 2200.

In operation 1730, the user terminal 600 may search for a quick command matching the recognized text. For example, the user terminal 600 may search for a quick command matching the recognized text from at least one of the memory 650 or the database 300 of the intelligent server 2200, and as a result, obtain a quick command matching the recognized text.

In operation 1740, the user terminal 600 may determine whether there are a plurality of quick commands found. For example, the user terminal 600 may determine whether there are a plurality of quick commands matching the recognized text. For another example, the user terminal 600 may determine whether there are a plurality of tasks mapped to the recognized text that is a quick command.

In operation 1750, when the found quick command includes a plurality of quick commands, the user terminal 600 may obtain context information related to the user terminal 600 and execution condition information related to the quick command, and select one quick command from among the plurality of quick commands (or select one task from among a plurality of tasks mapped to the recognized text) based on the context information and the execution condition information. The user terminal 600 may select one quick command from among a plurality of quick commands further based on the use setting of the quick command.

Thereafter, the user terminal 600 may perform a task mapped to the determined quick command. For example, the user terminal 600 may obtain a command list related to the determined quick command and transmit the obtained quick command list to the intelligent server 2200.

Figure 18:
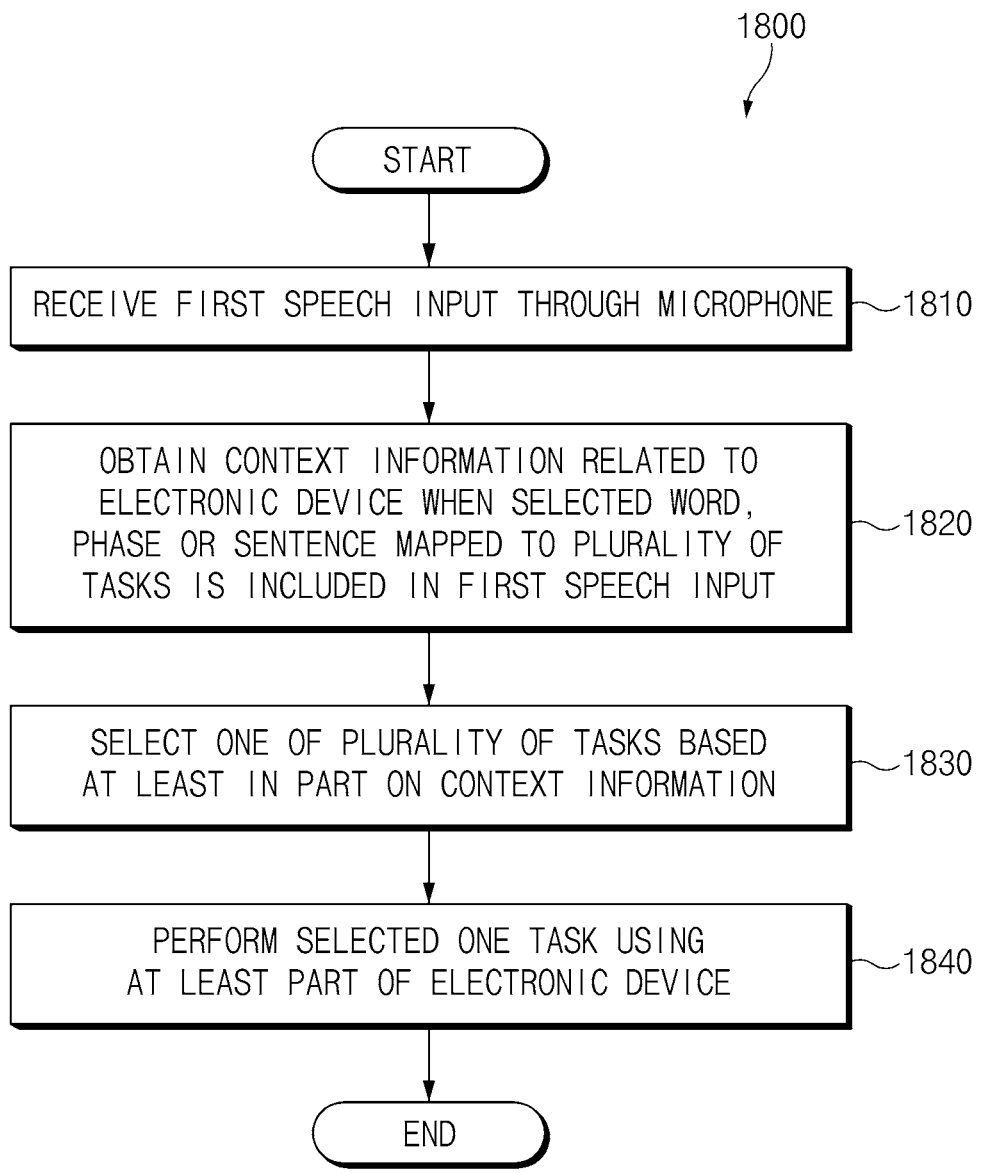
FIG. 18 is a flowchart of a method of performing a task mapped to a quick command according to an embodiment.

FIG. 18 is a flowchart 1800 of a method of performing a task mapped to a quick command according to an embodiment.

Referring to FIG. 18, in operation 1810, the processor 660 may receive a first speech input through the microphone 620. For example, the processor 660 may receive the first speech input through an intelligent app in a state where the intelligent app is executed.

In operation 1820, when the first speech input includes one of a selected word, phrase, or sentence mapped to a plurality of tasks, the processor 660 may obtain context information related to the user terminal 600. For example, the processor 660 may recognize text from the first speech input and determine whether the recognized text includes the word, phrase, or sentence—a quick command—selected by the user. The processor 660 may obtain context information related to the user terminal 600 by searching for a plurality of tasks mapped to the selected word, phrase or sentence from the memory 650 or the database 300. The context information may include at least one of, for example, location information of the user terminal 600, application or service information used in the user terminal 600, session information of the user terminal 600, display information of the user terminal 600, Wi-Fi status information of the user terminal 600, or time information of the user terminal 600.

In operation 1830, the processor 660 may select one task from among the plurality of tasks based at least in part on the context information. For example, the processor 660 may identify execution conditions of the plurality of tasks and select one task having an execution condition matching the context information from among the plurality of tasks.

In operation 1840, the processor 660 may perform the selected one task by using at least a part of the user terminal 600. For example, the processor 660 may obtain a command list related to the selected word, phrase, or sentence, and transmit the obtained command list to the intelligent server 2200. For another example, task information (e.g., at least one action ID) related to the selected word, phrase, or sentence may be transmitted to the intelligent server 2200.

According to an embodiment, a method of performing a task corresponding to a quick command in at least one processor (e.g., at least one of the first quick command manager 230 of FIG. 3 and the processor 660 of FIG. 6) may include receiving a first speech input according to utterance of the user through the microphone; obtaining context information related to the electronic device when one of the word, phrase or sentence, which is mapped to a plurality of tasks, is included in the first speech input; selecting one of the plurality of tasks based at least in part on the context information, and performing the selected one task using at least a part of the electronic device.

Figure 19:
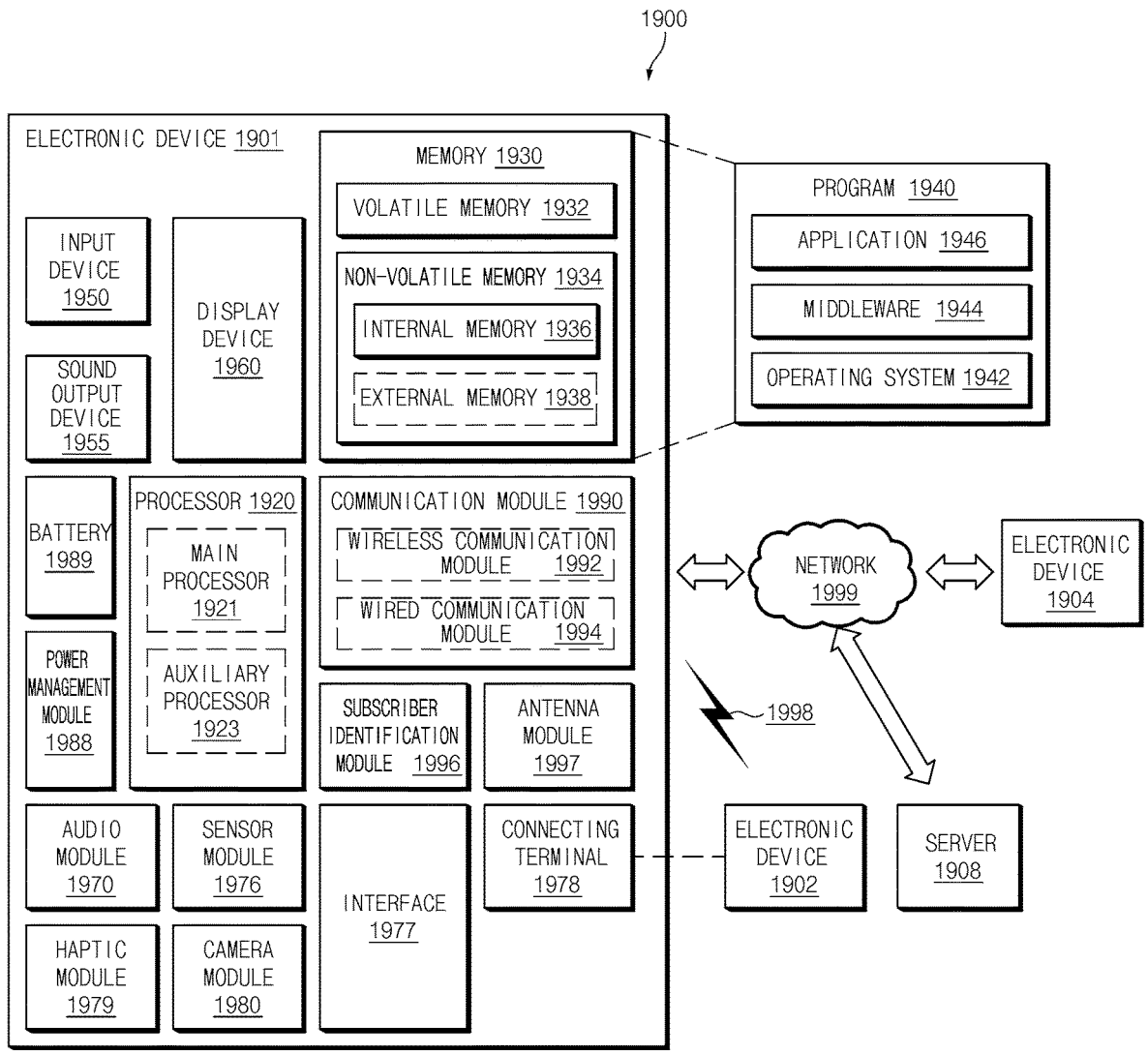
FIG. 19 is a block diagram of an electronic device in a network environment according to various embodiments.

FIG. 19 is a block diagram of an electronic device in a network environment according to various embodiments.

Referring to FIG. 19, an electronic device 1901 may communicate with an electronic device 1902 through a first network 1998 (e.g., a short-range wireless communication) or may communicate with an electronic device 1904 or a server 1908 through a second network 1999 (e.g., a long-distance wireless communication) in a network environment 1900. According to an embodiment, the electronic device 1901 may communicate with the electronic device 1904 through the server 1908. According to an embodiment, the electronic device 1901 may include a processor 1920, a memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module 1996, and an antenna module 1997. According to some embodiments, at least one (e.g., the display device 1960 or the camera module 1980) among components of the electronic device 1901 may be omitted or other components may be added to the electronic device 1901. According to some embodiments, some components may be integrated and implemented as in the case of the sensor module 1976 (e.g., a fingerprint sensor, an iris sensor, or an illuminance sensor) embedded in the display device 1960 (e.g., a display).

The processor 1920 may operate, for example, software (e.g., a program 1940) to control at least one of other components (e.g., a hardware or software component) of the electronic device 1901 connected to the processor 1920 and may process and compute a variety of data. The processor 1920 may load a command set or data, which is received from other components (e.g., the sensor module 1976 or the communication module 1990), into a volatile memory 1932, may process the loaded command or data, and may store result data into a nonvolatile memory 1934. According to an embodiment, the processor 1920 may include a main processor 1921 (e.g., a central processing unit or an application processor) and an auxiliary processor 1923 (e.g., a graphic processing device, an image signal processor, a sensor hub processor, or a communication processor), which operates independently from the main processor 1921, additionally or alternatively uses less power than the main processor 1921, or is specified to a designated function. In this case, the auxiliary processor 1923 may operate separately from the main processor 1921 or embedded.

In this case, the auxiliary processor 1923 may control, for example, at least some of functions or states associated with at least one component (e.g., the display device 1960, the sensor module 1976, or the communication module 1990) among the components of the electronic device 1901 instead of the main processor 1921 while the main processor 1921 is in an inactive (e.g., sleep) state or together with the main processor 1921 while the main processor 1921 is in an active (e.g., an application execution) state. According to an embodiment, the auxiliary processor 1923 (e.g., the image signal processor or the communication processor) may be implemented as a part of another component (e.g., the camera module 1980 or the communication module 1990) that is functionally related to the auxiliary processor 1923. The memory 1930 may store a variety of data used by at least one component (e.g., the processor 1920 or the sensor module 1976) of the electronic device 1901, for example, software (e.g., the program 1940) and input data or output data with respect to commands associated with the software. The memory 1930 may include the volatile memory 1932 or the nonvolatile memory 1934.

The program 1940 may be stored in the memory 1930 as software and may include, for example, an operating system 1942, a middleware 1944, or an application 1946.

The input device 1950 may be a device for receiving a command or data, which is used for a component (e.g., the processor 1920) of the electronic device 1901, from an outside (e.g., a user) of the electronic device 1901 and may include, for example, a microphone, a mouse, or a keyboard.

The sound output device 1955 may be a device for outputting a sound signal to the outside of the electronic device 1901 and may include, for example, a speaker used for general purposes, such as multimedia play or recordings play, and a receiver used only for receiving calls. According to an embodiment, the receiver and the speaker may be either integrally or separately implemented.

The display device 1960 may be a device for visually presenting information to the user of the electronic device 1901 and may include, for example, a display, a hologram device, or a projector and a control circuit for controlling a corresponding device. According to an embodiment, the display device 1960 may include a touch circuitry or a pressure sensor for measuring an intensity of pressure on the touch.

The audio module 1970 may convert a sound and an electrical signal in dual directions. According to an embodiment, the audio module 1970 may obtain the sound through the input device 1950 or may output the sound through an external electronic device (e.g., the electronic device 1902 (e.g., a speaker or a headphone)) wired or wirelessly connected to the sound output device 1955 or the electronic device 1901.

The sensor module 1976 may generate an electrical signal or a data value corresponding to an operating state (e.g., power or temperature) inside or an environmental state outside the electronic device 1901. The sensor module 1976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1977 may support a designated protocol wired or wirelessly connected to the external electronic device (e.g., the electronic device 1902). According to an embodiment, the interface 1977 may include, for example, an HDMI (high-definition multimedia interface), a USB (universal serial bus) interface, an SD card interface, or an audio interface.

A connecting terminal 1978 may include a connector that physically connects the electronic device 1901 to the external electronic device (e.g., the electronic device 1902), for example, an HDMI connector, a USB connector, an SD card connector, or an audio connector (e.g., a headphone connector).

The haptic module 1979 may convert an electrical signal to a mechanical stimulation (e.g., vibration or movement) or an electrical stimulation perceived by the user through tactile or kinesthetic sensations. The haptic module 1979 may include, for example, a motor, a piezoelectric element, or an electric stimulator.

The camera module 1980 may shoot a still image or a video image. According to an embodiment, the camera module 1980 may include, for example, at least one lens, an image sensor, an image signal processor, or a flash.

The power management module 1988 may be a module for managing power supplied to the electronic device 1901 and may serve as at least a part of a power management integrated circuit (PMIC).

The battery 1989 may be a device for supplying power to at least one component of the electronic device 1901 and may include, for example, a non-rechargeable (primary) battery, a rechargeable (secondary) battery, or a fuel cell.

The communication module 1990 may establish a wired or wireless communication channel between the electronic device 1901 and the external electronic device (e.g., the electronic device 1902, the electronic device 1904, or the server 1908) and support communication execution through the established communication channel. The communication module 1990 may include at least one communication processor operating independently from the processor 1920 (e.g., the application processor) and supporting the wired communication or the wireless communication. According to an embodiment, the communication module 1990 may include a wireless communication module 1992 (e.g., a cellular communication module, a short-range wireless communication module, or a GNSS (global navigation satellite system) communication module) or a wired communication module 1994 (e.g., an LAN (local area network) communication module or a power line communication module) and may communicate with the external electronic device using a corresponding communication module among them through the first network 1998 (e.g., the short-range communication network such as a Bluetooth, a WiFi direct, or an IrDA (infrared data association)) or the second network 1999 (e.g., the long-distance wireless communication network such as a cellular network, an internet, or a computer network (e.g., LAN or WAN)). The above-mentioned various communication modules 1990 may be implemented into one chip or into separate chips, respectively. According to an embodiment, the wireless communication module 1992 may identify and authenticate the electronic device 1901 using user information stored in the subscriber identification module 1996 in the communication network.

The antenna module 1997 may include one or more antennas to transmit or receive the signal or power to or from an external source. According to an embodiment, the communication module 1990 (e.g., the wireless communication module 1992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1901 and the external electronic device 1904 through the server 1908 connected to the second network 1999. Each of the electronic devices 1902 and 1904 may be the same or different types as or from the electronic device 1901. According to an embodiment, all or some of the operations performed by the electronic device 1901 may be performed by another electronic device or a plurality of external electronic devices. When the electronic device 1901 performs some functions or services automatically or by request, the electronic device 1901 may request the external electronic device to perform at least some of the functions related to the functions or services, in addition to or instead of performing the functions or services by itself. The external electronic device receiving the request may carry out the requested function or the additional function and transmit the result to the electronic device 1901. The electronic device 1901 may provide the requested functions or services based on the received result as is or after additionally processing the received result. To this end, for example, a cloud computing, distributed computing, or client-server computing technology may be used.

Figure 20:
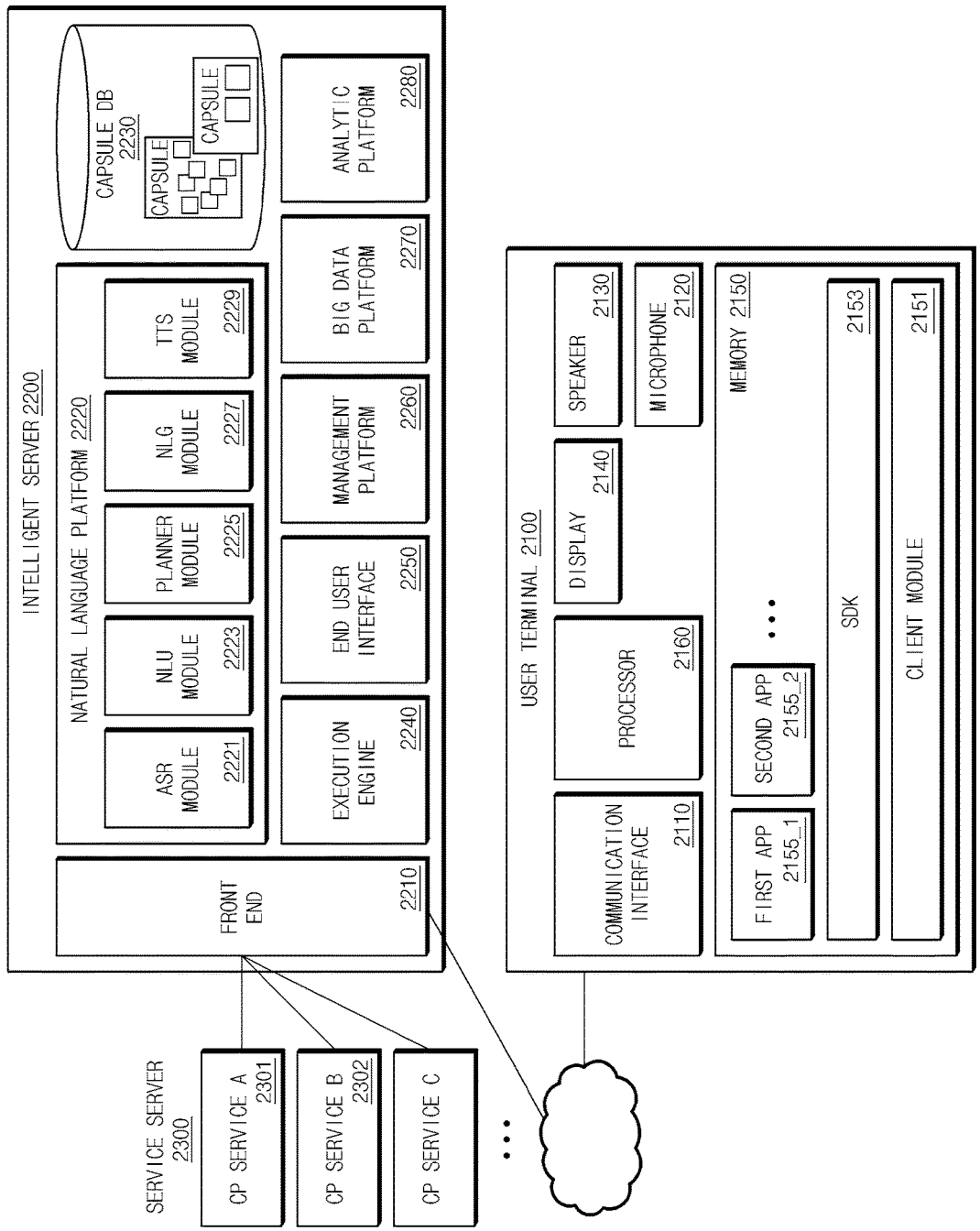
FIG. 20 is a block diagram of an integrated intelligence system according to an embodiment.

FIG. 20 is a block diagram of an integrated intelligence system according to an embodiment.

Referring to FIG. 20, an integrated intelligent system 210 of an embodiment may include a user terminal 2100 (e.g., the user terminal 600 of FIG. 1), the intelligent server 2200 (e.g., the intelligent server 200 of FIG. 1) and a service server 2300.

The user terminal 2100 according to an embodiment may be a terminal device (or electronic device) capable of connecting to the Internet, and may be for example, a mobile phone, a smart phone, a personal digital assistant (PDA), a notebook computer, a TV, a white appliance, a wearable device, a head mounted device (HMD), or a smart speaker.

According to the illustrated embodiment, the user terminal 2100 may include a communication interface 2110 (e.g., the communication circuit 610 in FIG. 6), a microphone 2120 (e.g., the microphone 620 in FIG. 6), a speaker 2130, a display 2140 (e.g., the display 640 of FIG. 6), a memory 2150 (e.g., the memory 650 of FIG. 6), or a processor 2160 (e.g., the processor 660 of FIG. 6). The components listed above may be operatively or electrically connected to each other.

The communication interface 2110 according to an embodiment may be connected to an external device to transmit and receive data. The microphone 2120 according to an embodiment may receive sound (e.g., utterance of a user) and convert the sound into an electrical signal. The speaker 2130 according to an embodiment may output sound (e.g., speech) corresponding to the electrical signal. The display 2140 according to an embodiment may be configured to display an image or video. The display 2140 according to an embodiment may also display a graphic user interface (GUI) of an executed app (or an application program).

The memory 2150 according to an embodiment may store a client module 2151, a software development kit (SDK) 2153, and a plurality of apps 2155. The client module 2151 and the SDK 2153 may constitute a framework (or a solution program) for performing a general function. In addition, the client module 2151 or the SDK 2153 may configure a framework for processing a speech input.

The memory 2150 according to an embodiment may be a program for performing specified functions of the plurality of apps 2155. According to an embodiment, the plurality of apps 2155 may include a first app 2155_1 and a second app 2155_3. According to an embodiment, each of the plurality of apps 2155 may include a plurality of actions for performing a specified function. For example, the apps may include an alarm app, a message app, and/or a schedule app. According to an embodiment, the plurality of apps 2155 may be executed by the processor 2160 to sequentially execute at least some of the plurality of actions.

The processor 2160 according to an embodiment may control the overall operation of the user terminal 2100. For example, the processor 2160 may be electrically connected to the communication interface 2110, the microphone 2120, the speaker 2130, and the display 2140 to perform a specified action.

The processor 2160 according to an embodiment may also execute a program stored in the memory 2150 to perform a specified function. For example, the processor 2160 may execute at least one of the client module 2151 and the SDK 2153 to perform the following operations for processing a speech input. The processor 2160 may control actions of the plurality of apps 2155 through the SDK 2153, for example. The action to be described as the action of the client module 2151 or the SDK 2153 may be an action by execution of the processor 2160.

The client module 2151 (e.g., the client module 661 of FIG. 6) according to an embodiment may receive a speech input. For example, the client module 2151 may receive a speech signal corresponding to a user's utterance detected through the microphone 2120. The client module 2151 may transmit the received speech input to the intelligent server 2200. The client module 2151 may transmit state information of the user terminal 2100 to the intelligent server 2200 along with the received speech input. The state information may be, for example, information on an execution state of an app.

The client module 2151 according to an embodiment may receive a result corresponding to the received speech input. For example, when the intelligent server 2200 is able to calculate a result corresponding to the received speech input, the client module 2151 may receive a result corresponding to the received speech input. The client module 2151 may display the received result on the display 2140.

The client module 2151 according to an embodiment may receive a plan corresponding to the received speech input. The client module 2151 may display results of execution of a plurality of actions of the app according to the plan on the display 2140. The client module 2151 may sequentially display, for example, the results of execution of the plurality of actions on the display. As another example, the user terminal 2100 may display only a part of the results of the execution of the plurality of actions (e.g., a result of the last action) on the display.

According to an embodiment, the client module 2151 may receive a request from the intelligent server 2200 to obtain information necessary to calculate a result corresponding to a speech input. According to an embodiment, the client module 2151 may transmit the necessary information to the intelligent server 2200 in response to the request.

The client module 2151 according to an embodiment may transmit result information on the results of execution of the plurality of actions according to a plan to the intelligent server 2200. The intelligent server 2200 may identify that the received speech input has been correctly processed using the result information.

The client module 2151 according to an embodiment may include a speech recognition module. According to an embodiment, the client module 2151 may recognize a speech input for performing a limited function through the speech recognition module. For example, the client module 2151 may execute an intelligent app for processing a speech input for performing a relevant action through a specified input (e.g., wake-up!).

The intelligent server 2200 according to an embodiment may receive information related to a user's speech input from the user terminal 2100 through a communication network. According to an embodiment, the intelligent server 2200 may convert data related to the received speech input into text data. According to an embodiment, the intelligent server 2200 may generate a plan for performing a task corresponding to the user's speech input based on the text data.

According to an embodiment, the plan may be generated by an artificial intelligent (AI) system. The artificial intelligence system may be a rule-based system, a neural network-based system (e.g., a feedforward neural network (FNN)), or a recurrent neural network (RNN). Alternatively, it may be a combination of the above-described systems or another artificial intelligence system. According to an embodiment, the plan may be selected from a set of predefined plans, or may be generated in real time in response to a user request. For example, the artificial intelligence system may select at least one of a plurality of predefined plans.

The intelligent server 2200 according to an embodiment may transmit a result according to the generated plan to the user terminal 2100 or transmit the generated plan to the user terminal 2100. According to an embodiment, the user terminal 2100 may display a result according to the plan on a display. According to an embodiment, the user terminal 2100 may display a result of execution of an action according to a plan on a display.

The intelligent server 2200 according to an embodiment may include a front end 2210, a natural language platform 2220, a capsule DB 2230 (e.g., the database 300 of FIG. 2), an execution engine 2240, an end user interface 2250, a management platform 2260, a big data platform 2270, or an analytic platform 2280.

The front end 2210 according to an embodiment may receive a speech input received from the user terminal 2100. The front end 2210 may transmit a response corresponding to the speech input.

According to an embodiment, the natural language platform 2220 may include an automatic speech recognition module (ASR module) 2221 (e.g., the automatic speech recognition module 210 of FIG. 2), a natural language understanding module (NLU module) 2223 (e.g., the NLU module 220 of FIG. 2), a planner module 2225 (e.g., the planner module 240 of FIG. 2), a natural language generator module (NLG module) 2227 or a text to speech module (TTS module) 2229.

The automatic speech recognition module 2221 according to an embodiment may convert a speech input received from the user terminal 2100 into text data. The natural language understanding module 2223 according to an embodiment may figure out a user's intention by using the text data of the speech input. For example, the natural language understanding module 2223 may figure out the user's intention by performing a syntactic analysis or a semantic analysis. The natural language understanding module 2223 according to an embodiment may figure out a meaning of a word extracted from a speech input using linguistic features (e.g., grammatical elements) of a morpheme or phrase, and determine the user's intention by matching the meaning of the word which is figured out to the user's intention.

The planner module 2225 according to an embodiment may generate a plan using the intention and parameters determined by the natural language understanding module 2223. According to an embodiment, the planner module 2225 may determine a plurality of domains required to perform a task based on the determined intention. The planner module 2225 may determine a plurality of actions included in each of the plurality of domains determined based on the intention. According to an embodiment, the planner module 2225 may determine a parameter required to execute the determined plurality of actions or a result value output by execution of the plurality of actions. The parameter and the result value may be defined as a concept with a specified format (or class). Accordingly, the plan may include a plurality of actions and a plurality of concepts determined by the user's intention. The planner module 2225 may determine a relationship between the plurality of actions and the plurality of concepts in stages (or hierarchical). For example, the planner module 2225 may determine an execution order of a plurality of actions determined based on the user's intention based on a plurality of concepts. In other words, the planner module 2225 may determine the execution order of the plurality of actions based on the parameter required for execution of the plurality of actions and a result output by the execution of the plurality of actions. Accordingly, the planner module 2225 may generate a plan including the plurality of actions and relationship information (e.g., ontology) between the plurality of concepts. The planner module 2225 may generate a plan using information stored in a capsule database 2230 in which a set of relationships between concepts and actions is stored.

The natural language generator module 2227 according to an embodiment may change the specified information into a text form. The information changed into the text form may have the form of utterance in natural language. The text-to-speech module 2229 according to an embodiment may change information in text form into information in speech form.

According to an embodiment, some or all of the functions of the natural language platform 2220 may be also implemented in the user terminal 2100.

The capsule database 2230 may store information on a relationship between a plurality of concepts and a plurality of actions corresponding to a plurality of domains. A capsule according to an embodiment may include a plurality of action objects (or action information) and concept objects (or concept information) included in a plan. According to an embodiment, the capsule database 2230 may store a plurality of capsules in the form of a concept action network (CAN). According to an embodiment, the plurality of capsules may be stored in a function registry included in the capsule database 2230.

The capsule database 2230 may include a strategy registry in which strategy information necessary to determine a plan corresponding to a speech input is stored. The strategy information may include reference information for determining one plan when there are a plurality of plans corresponding to the speech input. According to an embodiment, the capsule database 2230 may include a follow-up registry in which information on a follow-up action for suggesting a follow-up action to a user in a specified situation is stored. The follow-up action may include, for example, a subsequent utterance. According to an embodiment, the capsule database 2230 may include a layout registry that stores layout information of information output through the user terminal 2100. According to an embodiment, the capsule database 2230 may include a vocabulary registry in which vocabulary information included in the capsule information is stored. According to an embodiment, the capsule database 2230 may include a dialog registry in which information on a dialog (or interaction) with a user is stored. The capsule database 2230 may update an object stored through a developer tool. The developer tool may include a function editor for updating an action object or a concept object, for example. The developer tool may include a vocabulary editor for updating vocabulary. The developer tool may include a strategy editor for creating and registering a strategy for determining a plan. The developer tool may include a dialog editor for creating a dialog with a user. The developer tool may include a follow-up editor for activating a follow-up target and editing a subsequent utterance that provides a hint. The follow-up target may be determined based on a currently set target, user preference, or environmental conditions. In an embodiment, the capsule database 2230 may be also implemented in the user terminal 2100.

The execution engine 2240 according to an embodiment may calculate a result using the created plan. The end user interface 2250 may transmit the calculated result to the user terminal 2100. Accordingly, the user terminal 2100 may receive the result and provide the received result to the user. The management platform 2260 according to an embodiment may manage information used in the intelligent server 2200. The big data platform 2270 according to an embodiment may collect user data. The analytic platform 2280 according to an embodiment may manage quality of service (QoS) of the intelligent server 2200. For example, the analytic platform 2280 may manage components and a processing speed (or efficiency) of the intelligent server 2200.

The service server 2300 according to an embodiment may provide a specified service (e.g., food order or hotel reservation) to the user terminal 2100. According to an embodiment, the service server 2300 may be a server operated by a third party. The service server 2300 according to an embodiment may provide information for generating a plan corresponding to the received speech input to the intelligent server 2200. The provided information may be stored in the capsule database 2230. Also, the service server 2300 may provide result information according to the plan to the intelligent server 2200.

In the integrated intelligent system 210 described above, the user terminal 2100 may provide various intelligent services to a user in response to a user input. The user input may include, for example, an input through a physical button, a touch input, or a speech input.

In an embodiment, the user terminal 2100 may provide a speech recognition service through an intelligent app (or speech recognition app) stored therein. In this case, for example, the user terminal 2100 may recognize a user utterance or speech input received through the microphone, and provide a service corresponding to the recognized speech input to the user.

In an embodiment, the user terminal 2100 may perform a specified action alone or together with the intelligent server and/or a service server, based on the received speech input. For example, the user terminal 2100 may execute an app corresponding to the received speech input and perform a specified action through the executed app.

In one embodiment, when the user terminal 2100 provides a service together with the intelligent server 2200 and/or the service server, the user terminal may detect a user utterance using the microphone 2120, and generate a signal (or speech data) corresponding to the detected user utterance. The user terminal may transmit the speech data to the intelligent server 2200 using the communication interface 2110.

The intelligent server 2200 according to an embodiment may generate a plan for performing a task corresponding to the speech input or a result of performance of an action according to the plan, as a response to the speech input received from the user terminal 2100. The plan may include, for example, a plurality of actions for performing a task corresponding to the speech input of the user, and a plurality of concepts related to the plurality of actions. The concept may be to define a parameter input to execution of the plurality of actions or a result value output by execution of the plurality of actions. The plan may include relationship information between a plurality of actions and a plurality of concepts.

The user terminal 2100 according to an embodiment may receive the response using the communication interface 2110. The user terminal 2100 may output a speech signal generated in the user terminal 2100 to outside using the speaker 2130, or output an image generated in the user terminal 2100 to outside using the display 2140.

Figure 21:
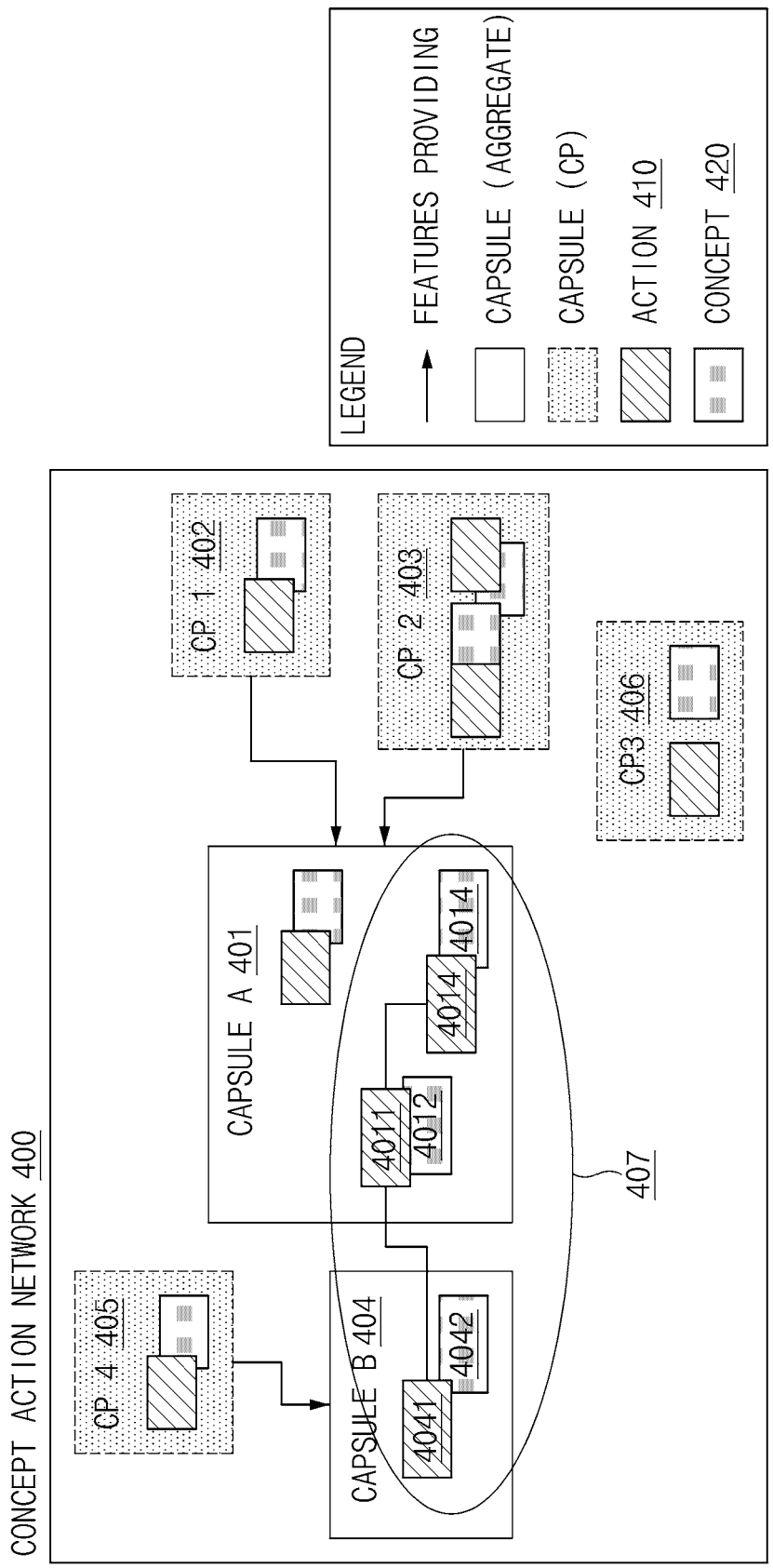
FIG. 21 is a diagram illustrating a form in which relationship information between a concept and an action is stored in a database according to an embodiment.

FIG. 21 is a diagram illustrating a form in which relationship information between a concept and an action is stored in a database according to various embodiments.

The capsule database (e.g., the capsule database 2230) of the intelligent server 2200 may store capsules in the form of a concept action network (CAN). The capsule database may store an action for processing a task corresponding to a user's speech input and a parameter necessary for the action in the form of a concept action network (CAN).

The capsule database may store a plurality of capsules (capsule A 401 and capsule B 404) respectively corresponding to a plurality of domains (e.g., applications). According to an embodiment, one capsule (e.g., capsule A 401) may correspond to one domain (e.g., location (geo), application). In addition, at least one service provider (e.g., CP 1 402 or CP 2 403) for performing a function for a domain related to the capsule may correspond to one capsule. According to an embodiment, one capsule may include at least one or more actions 410 for performing a specified function and at least one or more concepts 420.

The natural language platform 2220 may generate a plan for performing a task corresponding to a received speech input using a capsule stored in a capsule database. For example, the planner module 2225 of the natural language platform may generate a plan using capsules stored in the capsule database. For example, it may be possible to generate a plan 407 using the actions 4011 and 4013 and concepts 4012 and 4014 of the capsule A 410 and the action 4041 and concept 4042 of the capsule B 404.

Figure 22:
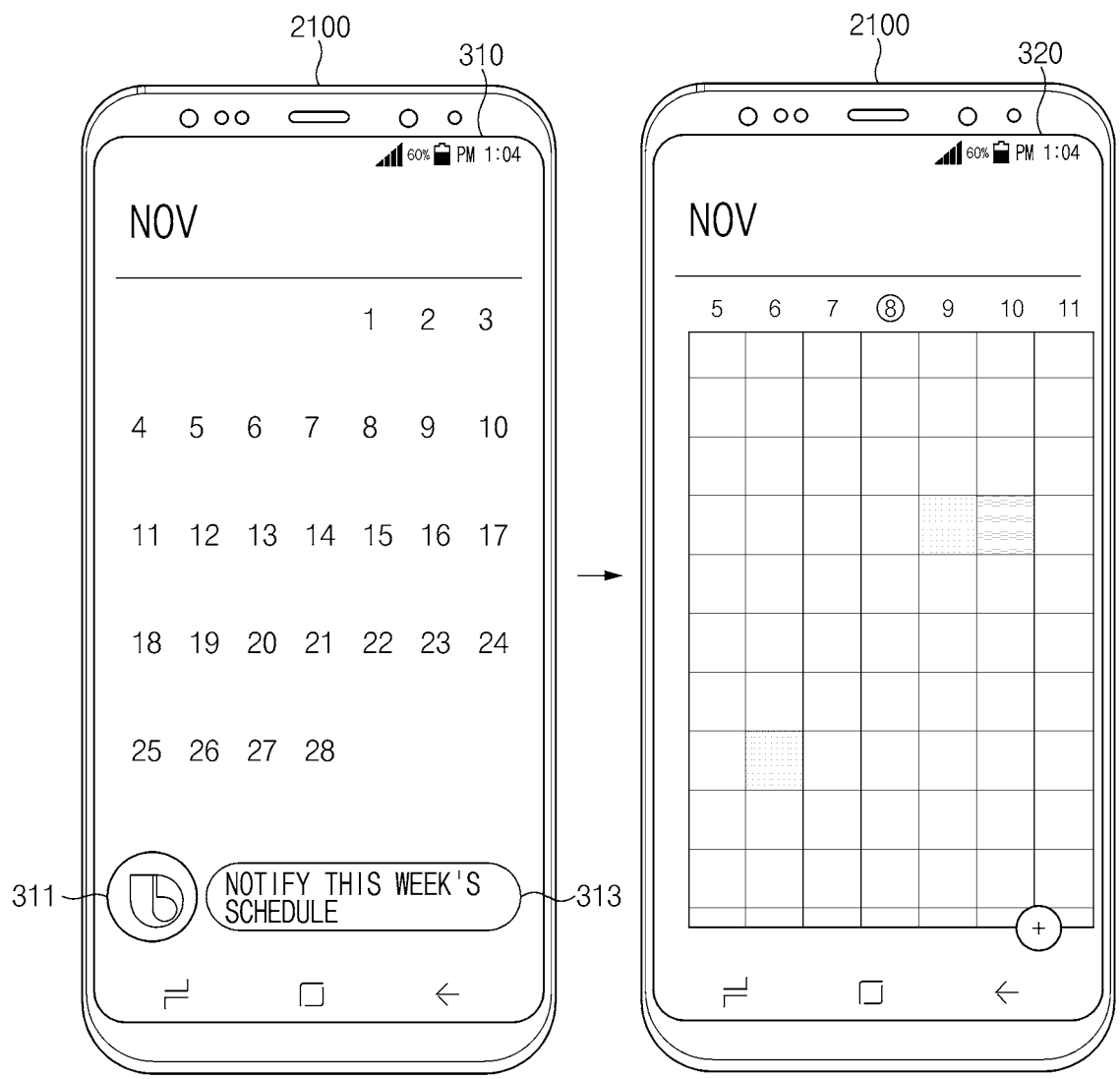
FIG. 22 is a diagram illustrating a user terminal displaying a screen for processing a speech input received through an intelligent app, according to an embodiment.

FIG. 22 is a diagram illustrating a screen in which a user terminal processes a speech input received through an intelligent app according to various embodiments.

The user terminal 2100 may execute an intelligent app to process a user input through the intelligent server 2200.

According to an embodiment, on screen 310, when the user terminal 2100 recognizes a specified speech input (e.g., wake-up!) or receives an input through a hardware key (e.g., a dedicated hardware key), the user terminal 2100 may execute an intelligent app for processing the speech input. The user terminal 2100 may execute the intelligent app while executing a schedule app, for example. According to an embodiment, the user terminal 2100 may display an object (e.g., an icon) 311 corresponding to the intelligent app on the display 2140. According to an embodiment, the user terminal 2100 may receive a speech input by a user utterance. For example, the user terminal 2100 may receive a speech input "notify this week's schedule!". According to an embodiment, the user terminal 2100 may display a user interface (UI) 313 (e.g., an input window) of the intelligent app in which text data of a received speech input is displayed on the display.

According to an embodiment, on screen 320, the user terminal 2100 may display a result corresponding to the received speech input on the display. For example, the user terminal 2100 may receive a plan corresponding to the received user input, and display 'this week schedule' on the display according to the plan.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 1940) including an instruction stored in a machine-readable storage media (e.g., an internal memory 1936 or an external memory 1938) readable by a machine (e.g., a computer). The machine may be a device that calls the instruction from the machine-readable storage media and operates depending on the called instruction and may include the electronic device (e.g., the electronic device 1901). When the instruction is executed by the processor (e.g., the processor 1920), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added. While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a microphone;
a wireless communication circuit;
a processor operatively connected to the display, the microphone, and the wireless communication circuit; and
a memory operatively connected to the processor,
wherein the memory is configured to:
store a quick command registered in the electronic device by a user, wherein a plurality of different user-customized tasks are mapped to the same quick command; and
store instructions which, when executed, cause the processor to:
receive a first speech input according to utterance of a user through the microphone,
identify text corresponding to the first speech input,
obtain context information related to the electronic device when the quick command to which the plurality of different user-customized tasks are mapped is included in the identified text,
identify execution condition information related to the plurality of user-customized tasks,
select one task of the plurality of different user-customized tasks having an execution condition matching the context information based at least in part on the context information and the execution condition information, wherein the execution condition is a selection condition included in the execution condition information mapped to the quick command, and
perform the selected one task using at least a part of the electronic device.

2. The electronic device of claim 1, wherein the plurality of user-customized tasks includes a plurality of actions.

3. The electronic device of claim 1, wherein the plurality of user-customized tasks includes a plurality of actions using a plurality of application programs.

4. The electronic device of claim 1, wherein the context information includes at least one of location information of the electronic device, application or service information used in the electronic device, session information of the electronic device, display information of the electronic device, or Wi-Fi state information of the electronic device.

5. The electronic device of claim 1, wherein the instructions are configured to cause the processor to
identify use setting information related to the plurality of user-customized tasks,
obtain at least one task that is set to be used from among the plurality of user-customized tasks based on the use setting information, and
select the one task from the at least one task.

6. The electronic device of claim 1, wherein, when a location-dependent task that is set to be performed at a specified location is included in the plurality of user-customized tasks, the instructions are configured to cause the processor to select the location-dependent task of the plurality of user-customized tasks when it is identified that the electronic device is located at the specified location, based on the context information.

7. The electronic device of claim 1, wherein, when a application-dependent task that is set to be performed in a state where a first application or a first service is being executed is included in the plurality of user-customized tasks, the instructions are configured to cause the processor to select the application-dependent task of the plurality of user-customized tasks when it is identified that the first application or the first service is being executed based on the context information.

8. The electronic device of claim 1, wherein, when a domain-dependent task that is set to be performed in a state where a first domain is specified is included in the plurality of user-customized tasks, the instructions are configured to cause the processor to select the domain-dependent task of the plurality of user-customized tasks when it is identified that the first domain is specified, based on the context information.

9. The electronic device of claim 1, wherein, when a screen-dependent task that is set to be performed in a state where a first screen is displayed on the display is included in the plurality of user-customized tasks, the instructions are configured to cause the processor to select the screen-dependent task of the plurality of user-customized tasks when it is identified that first screen is displayed on the display, based on the context information.

10. The electronic device of claim 1, wherein, when a WiFi-state-dependent task that is set to be performed in a state where a Wi-Fi state is in a first state is included in the plurality of user-customized tasks, the instructions are configured to cause the processor to select the WiFi-state-dependent task of the plurality of user-customized tasks when it is identified that the Wi-Fi state is in the first state based on the context information.

11. The electronic device of claim 1, wherein the instructions are configured to cause the processor to output a screen for guiding a selection for the one task of the plurality of user-customized tasks when it is hard to select the one task.

12. The electronic device of claim 1, wherein the quick command includes a word, phrase, or sentence selected by a user.

13. The electronic device of claim 1, wherein the instructions are configured to cause the processor to register the quick command to replace at least one long speech command having a larger number of texts than the quick command, by associating the quick command with a command list corresponding to the at least one long speech command.

14. A system comprising:
a display;
a microphone;
at least one processor; and
at least one memory,
wherein the memory is configured to:

store a quick command registered in an electronic device by a user, wherein a plurality of different user-customized tasks are mapped to the same quick command; and store instructions which, when executed, cause the processor to:
- receive a first speech input through the microphone,
- identify a text corresponding to the first speech input,
- obtain context information related to the electronic device when the quick command to which the plurality of different user-customized tasks are mapped is included in the identified text,
- identify execution condition information related to the plurality of user-customized tasks,
- select one task of the plurality of different user-customized tasks having an execution condition matching the context information based at least in part on the context information and the execution condition information, wherein the execution condition is a selection condition included in the execution condition information mapped to the quick command, and
- perform the selected one task.

* * * * *